United States Patent
Nishizaki

(10) Patent No.: US 11,509,632 B2
(45) Date of Patent: Nov. 22, 2022

(54) COMMUNICATION SYSTEM PERFORMING COMMUNICATIONS CONCERNING REQUESTS FOR REQUESTING COMMANDS

(71) Applicant: BROTHER KOGYO KABUSHIKI KAISHA, Aichi (JP)

(72) Inventor: Takashi Nishizaki, Nagoya (JP)

(73) Assignee: BROTHER KOGYO KABUSHIKI KAISHA, Nagoya (JP)

(*) Notice: Subject to any disclaimer, the term of this patent is extended or adjusted under 35 U.S.C. 154(b) by 325 days.

(21) Appl. No.: 16/382,330

(22) Filed: Apr. 12, 2019

(65) Prior Publication Data
US 2019/0319922 A1 Oct. 17, 2019

(30) Foreign Application Priority Data
Apr. 13, 2018 (JP) .............................. JP2018-077474

(51) Int. Cl.
*H04L 29/06* (2006.01)
*H04L 9/40* (2022.01)
(Continued)

(52) U.S. Cl.
CPC ............ *H04L 63/029* (2013.01); *H04L 63/02* (2013.01); *H04L 67/56* (2022.05); *G06F 3/123* (2013.01);
(Continued)

(58) Field of Classification Search
CPC .. H04W 12/088; H04L 63/02; H04L 63/0227; H04L 63/0218; H04L 63/0209;
(Continued)

(56) References Cited

U.S. PATENT DOCUMENTS

| 8,166,153 B2 * | 4/2012 | Watai ...................... H04L 41/06 709/224 |
| 8,510,822 B2 * | 8/2013 | Kitamura ............ H04L 63/0884 726/12 |

(Continued)

FOREIGN PATENT DOCUMENTS

| CN | 101202669 A | 6/2008 |
| JP | 2005301999 A | 10/2005 |

(Continued)

OTHER PUBLICATIONS

Office Action dated Mar. 29, 2022 received in Japanese Patent Application No. 2018-077474 together with an English language translation.

*Primary Examiner* — Shaqueal D Wade-Wright
(74) *Attorney, Agent, or Firm* — Scully, Scott, Murphy & Presser, P.C.

(57) ABSTRACT

A communication system includes a mediation apparatus communicating with a device via a local network and an information processing apparatus communicating with the mediation apparatus through firewall. The information processing apparatus including a first control device. The mediation apparatus includes a second control device transmitting to the information processing apparatus through the firewall a first request for requesting transmission of a first command for the device, and a second request for requesting transmission of a second command for the mediation apparatus. In response to receiving the first command, the second controller transmits to the device via the local network a device command. In response to receiving the second command, the second controller performs a second-command dependent instruction. In response to receiving the first request and the second request, the first control device
(Continued)

transmits respectively the first command and the second command to the mediation apparatus.

9 Claims, 12 Drawing Sheets

(51) Int. Cl.
    *H04L 67/56*     (2022.01)
    *G06F 3/12*     (2006.01)
    *H04W 12/088*     (2021.01)

(52) U.S. Cl.
    CPC ........ *G06F 3/1225* (2013.01); *H04L 63/0227* (2013.01); *H04W 12/088* (2021.01)

(58) Field of Classification Search
    CPC . H04L 7/28; G06F 3/12; G06F 3/1203; G06F 3/1205; G06F 3/1204; G06F 3/1208; G06F 3/122; G06F 3/1223; G06F 3/1224; G06F 3/1229; G06F 3/1227; G06F 3/1232; G06F 3/1258; G06F 3/1275; G06F 3/1283; G06F 3/1287; G06F 3/123; G06F 3/1225; G06F 3/1237; G06F 3/1231
See application file for complete search history.

(56) References Cited

U.S. PATENT DOCUMENTS

| | | | |
|---|---|---|---|
| 8,970,879 B2 * | 3/2015 | Nakamura | G06F 3/1287 358/1.15 |
| 11,108,616 B2 * | 8/2021 | Matsushima | H04L 41/042 |
| 2002/0161904 A1 * | 10/2002 | Tredoux | H04L 67/2814 709/229 |
| 2005/0243804 A1 | 11/2005 | Watai | |
| 2008/0140831 A1 | 6/2008 | Kawana | |
| 2016/0085533 A1 | 3/2016 | Jayanti et al. | |
| 2016/0087854 A1 | 3/2016 | Jayanti et al. | |
| 2016/0087955 A1 | 3/2016 | Mohamad et al. | |
| 2016/0087956 A1 | 3/2016 | Maheshwari et al. | |
| 2016/0088021 A1 | 3/2016 | Jayanti et al. | |
| 2016/0088026 A1 | 3/2016 | Mohamad et al. | |
| 2017/0054687 A1 * | 2/2017 | Ishigaki | H04L 63/0281 |
| 2019/0109921 A1 * | 4/2019 | Matsushima | H04L 41/044 |
| 2019/0268229 A1 * | 8/2019 | Haapanen | H04L 41/046 |
| 2020/0137166 A1 * | 4/2020 | Aoki | H04L 63/029 |

FOREIGN PATENT DOCUMENTS

| | | |
|---|---|---|
| JP | 2008146416 A | 6/2008 |
| JP | 2017-536598 A | 12/2017 |

* cited by examiner

FIG. 2 (A)

FIRST CORRELATION LIST
(OUTSIDE MEDIATION APPARATUS)

| EVENT ID | COMMAND TYPE |
|---|---|
| 01a | FIRST COMMAND |
| 01b | FIRST COMMAND |
| 01c | FIRST COMMAND |
| 01d | SECOND COMMAND |

FIG. 2 (B)

SECOND CORRELATION LIST
(INSIDE MEDIATION APPARATUS)

| EVENT ID | REQUEST TYPE |
|---|---|
| 01a | FOR PRINTER (FIRST EVENT ID) |
| 01b | FOR PRINTER (FIRST EVENT ID) |
| 01c | FOR PRINTER (FIRST EVENT ID) |
| 01d | FOR SECOND PROGRAM (SECOND EVENT ID) |

FIG. 2 (C)

CORRELATION DATABASE DB

| DEVICE ID | GUID | LOCATION INFO | FIRMWARE VERSION | SETTINGS INFORMATION ||||  | MODIFIED DATE | CONDITION INFO |
|---|---|---|---|---|---|---|---|---|---|
| | | | | FONT | FONT SIZE | DENSITY | ... | | |
| 001 | 00A | BRANCH OFFICE A | 2 | GOTHIC | 14 | 3 | ... | 2018.04.01 | MANAGING |
| 002 | 00A | BRANCH OFFICE A | 3 | GOTHIC | 14 | 3 | ... | 2018.04.03 | MANAGING |
| 003 | 00A | BRANCH OFFICE A | 2 | GOTHIC | 14 | 3 | ... | 2018.04.02 | MANAGING |
| 004 | 00B | BRANCH OFFICE B | 2 | GOTHIC | 12 | 2 | ... | 2018.04.02 | MANAGING |
| 005 | 00B | BRANCH OFFICE B | 2 | GOTHIC | 12 | 2 | ... | 2018.04.03 | MANAGING |
| 006 | 00C | BRANCH OFFICE C | 2 | MINCHO | 12 | 2 | ... | 2018.04.02 | MANAGING |
| 007 | 00C | BRANCH OFFICE C | 1 | MINCHO | 14 | 3 | ... | 2018.04.02 | MANAGING |
| 008 | 00C | BRANCH OFFICE C | — | — | — | — | ... | — | WAITING |
| ... | ... | ... | ... | ... | ... | ... | ... | ... | ... |

FIRST VARIATION

SECOND VARIATION

THIRD VARIATION

FOURTH VARIATION

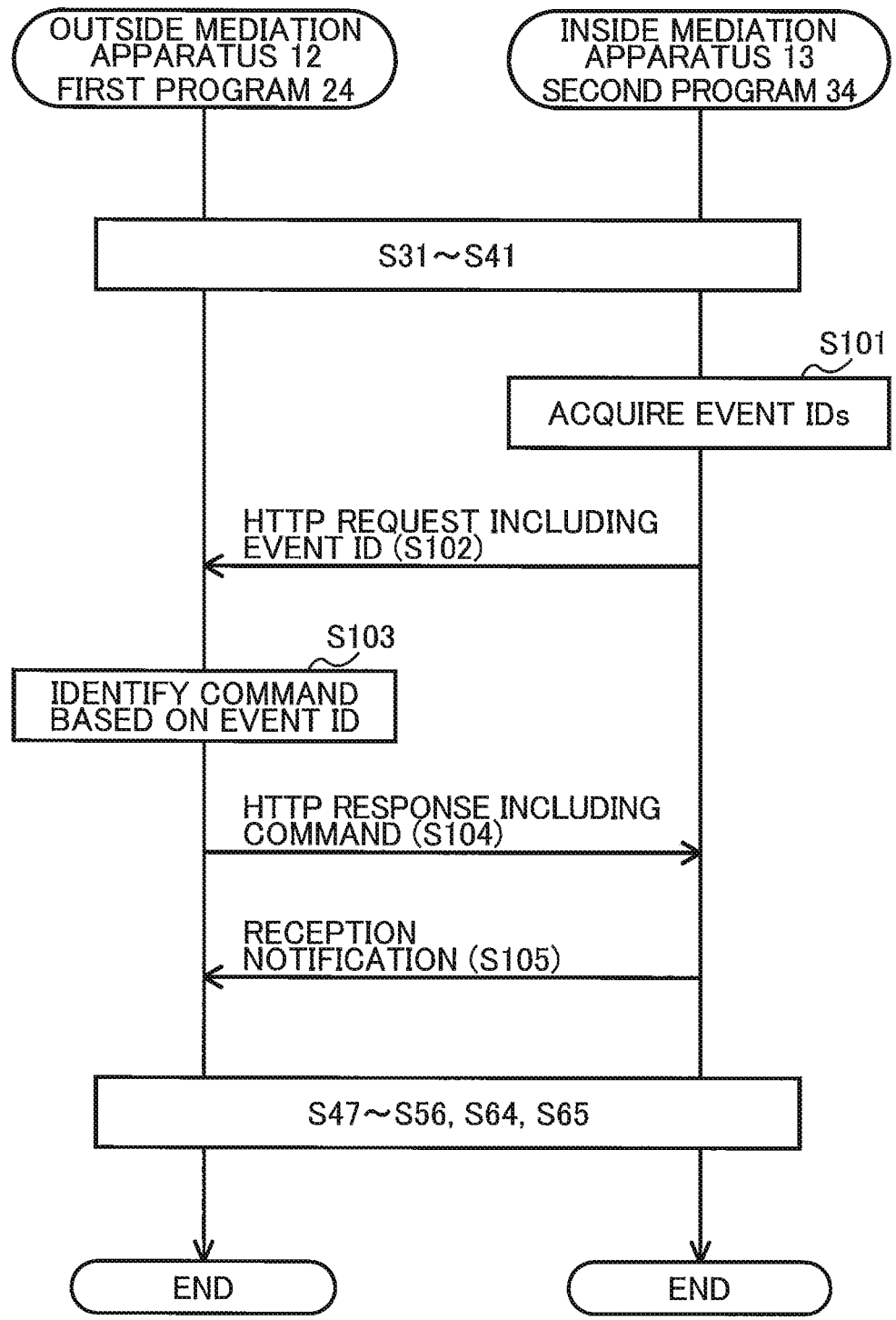

COMMUNICATION SYSTEM PERFORMING COMMUNICATIONS CONCERNING REQUESTS FOR REQUESTING COMMANDS

CROSS REFERENCE TO RELATED APPLICATION

This application claims priority from Japanese Patent Application No. 2018-077474 filed Apr. 13, 2018. The entire content of the priority application is incorporated herein by reference.

TECHNICAL FIELD

The present disclosure relates to a program and a communication system for managing devices.

BACKGROUND

A conventional mobile device management (abbreviated herein as MDM) system includes a management server on the Internet that communicates with and manages mobile devices. The mobile devices may be mobile phones, tablets, or notebook type personal computers that connect directly to the Internet and are capable of communicating with the management server.

SUMMARY

However, the conventional technology is not sufficiently considered with respect to management by the MDM system to manage devices that do not communicate directly with the management server.

In view of the foregoing it is an object of the present disclosure to provide a method of managing devices that do not communicate directly with a management server using a MDM system.

In order to attain the above and other objects, the disclosure provides a communication system. The communication system includes an information processing apparatus and a mediation apparatus. The information processing apparatus is configured to communicate with Internet and communicate with the mediation apparatus through firewall. The information processing apparatus including a first control device. The mediation apparatus is configured to communicate with a device via a local network. The mediation apparatus including a second control device configured to perform: transmitting to the information processing apparatus through the firewall a first request for requesting transmission of a first command for the device; transmitting to the information processing apparatus through the firewall a second request for requesting transmission of a second command for the mediation apparatus; in response to receiving the first command, transmitting to the device via the local network a device command based on the first command; and in response to receiving the second command, performing a second-command dependent instruction. The first control device is configured to perform: in response to receiving the first request, transmitting the first command to the mediation apparatus through the firewall; and in response to receiving the second request, transmitting the second command to the mediation apparatus through the firewall.

According to another aspect, the disclosure provides a communication system. The communication system includes an information processing apparatus and a mediation apparatus. The mediation apparatus is configured to communicate with a device via a local network. The information processing apparatus is configured to communicate with Internet and communicate with the mediation apparatus through firewall. The information processing apparatus includes: a memory storing correlation information which correlates each of event IDs with one of a first command and a second command. The first command is for the device and the second command is for the mediation apparatus; and a first control device configured to perform: transmitting event information according to a series of procedures which is initiated by the mediation apparatus and enables the mediation apparatus to receive information from the information processing apparatus through the firewall, the event information including a plurality of event IDs and specifying an order of the plurality of event IDs; receiving a command transmission request from the mediation apparatus through the firewall, the command transmission request including an event ID included in the event information; determining one of the first command and the second command as a target command for transmission on a basis of the event ID included in the command transmission request by using the correlation information; and transmitting the target command to the mediation apparatus through the firewall. The mediation apparatus includes a second control device configured to perform: initiating the series of procedures enabling the mediation apparatus to receive information from the information apparatus through the firewall; receiving the event information from the information processing apparatus through the firewall; transmitting separately a plurality of command transmission requests including respective ones of the plurality of event IDs included in the event information to the information processing apparatus through the firewall so that the plurality of event IDs is transmitted to the information processing apparatus according to the order specified by the event information; receiving the target command from the information processing apparatus through the firewall; in response to receiving the first command as the target command, transmitting to the device via the local network a device command which the device is capable of interpreting on a basis of the first command; and in response to receiving the second command as the target command, performing a second-command-dependent instruction based on the second command.

According to still another aspect, the disclosure provides a non-transitory computer readable storage medium storing a set of program instructions comprising first program instructions executed by an information processing apparatus, and second program instructions executed by a mediation apparatus. The information processing apparatus is configured to communicate with Internet and communicate with the mediation apparatus through firewall. The mediation apparatus is configured to communicate with a device via a local network. The second program instructions include: transmitting to the information processing apparatus through the firewall a first request for requesting transmission of a first command for the device; transmitting to the information processing apparatus through the firewall a second request for requesting transmission of a second command for the mediation apparatus; in response to receiving the first command, transmitting to the device via the local network a device command based on the first command; and in response to receiving the second command, performing a second-command dependent instruction. The first program instructions include: in response to receiving the first request, transmitting the first command to the mediation apparatus through the firewall; and in response to receiving the second request, transmitting the second command to the mediation apparatus through the firewall.

According to still another aspect, the disclosure provides a non-transitory computer readable storage medium storing a set of program instructions comprising first program instructions executed by an information processing apparatus, and second program instructions executed by a mediation apparatus. The mediation apparatus is configured to communicate with a device via a local network. The information processing apparatus is configured to communicate with Internet and communicate with the mediation apparatus through firewall. The information processing apparatus includes a memory storing correlation information which correlates each of event IDs with one of a first command and a second command. The first command is for the device and the second command is for the mediation apparatus. The first program instructions include: transmitting event information according to a series of procedures which is initiated by the mediation apparatus and enables the mediation apparatus to receive information from the information processing apparatus through the firewall, the event information including a plurality of event IDs and specifying an order of the plurality of event IDs; receiving a command transmission request from the mediation apparatus through the firewall, the command transmission request including an event ID included in the event information; determining one of the first command and the second command as a target command for transmission on a basis of the event ID included in the command transmission request by using the correlation information; and transmitting the target command to the mediation apparatus through the firewall. The second program instructions include: initiating the series of procedures enabling the mediation apparatus to receive information from the information apparatus through the firewall; receiving the event information from the information processing apparatus through the firewall; transmitting separately a plurality of command transmission requests including respective ones of the plurality of event IDs included in the event information to the information processing apparatus through the firewall so that the plurality of event IDs is transmitted to the information processing apparatus according to the order specified by the event information; receiving the target command from the information processing apparatus through the firewall; in response to receiving the first command as the target command, transmitting to the device via the local network a device command which the device is capable of interpreting on a basis of the first command; and in response to receiving the second command as the target command, performing a second-command-dependent instruction based on the second command.

BRIEF DESCRIPTION OF THE DRAWINGS

The particular features and advantages of the disclosure as well as other objects will become apparent from the following description taken in connection with the accompanying drawings, in which:

FIG. 2(A) is a table illustrating a first correlation list;

FIG. 2(B) is a table illustrating a second correlation list;

FIG. 2(C) is a table illustrating a correlation database;

FIG. 9 is a sequence diagram illustrating a process according to a fifth variation.

DETAILED DESCRIPTION

Figure 1:
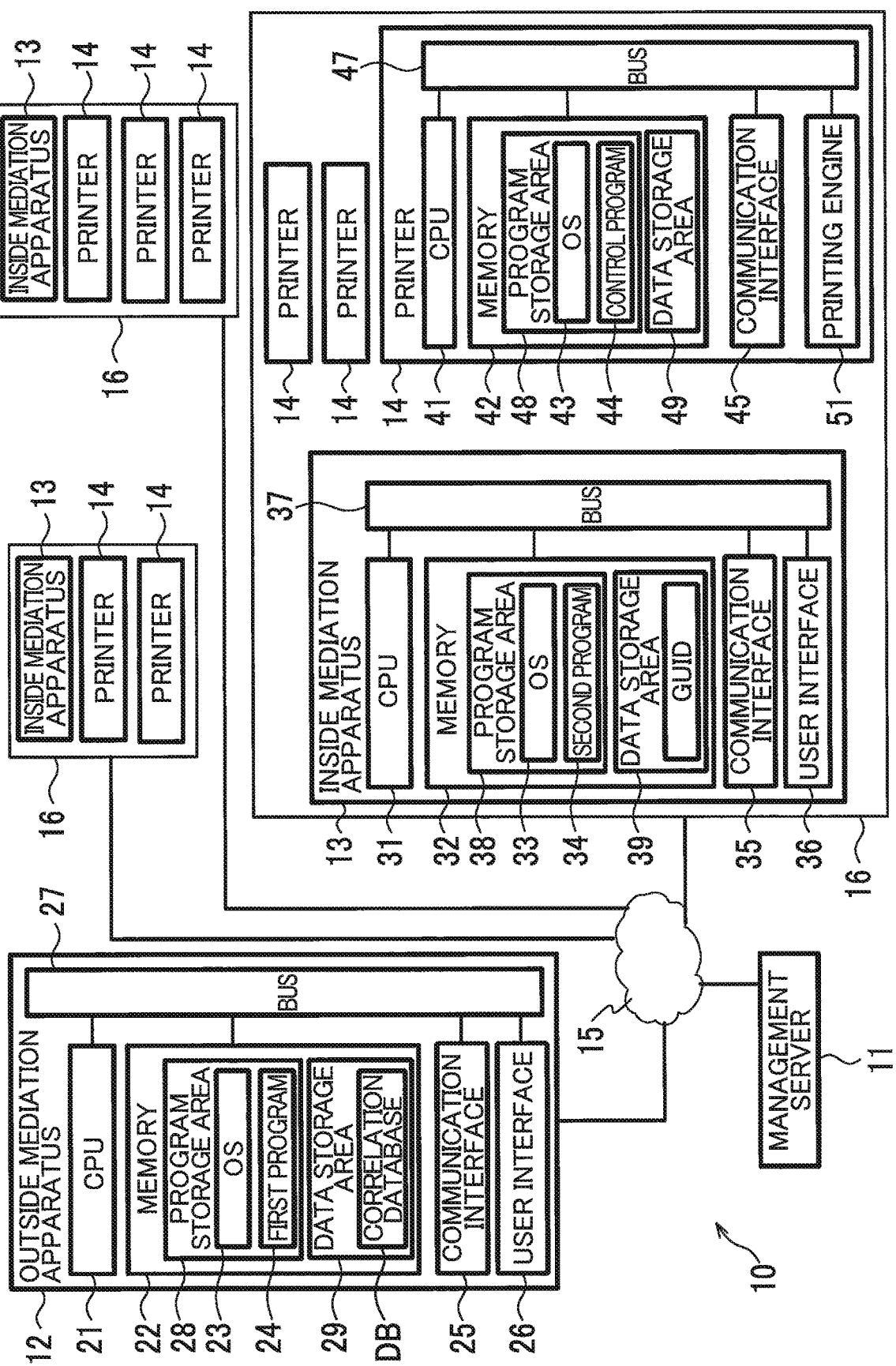
FIG. 1 is a block diagram illustrating a management system according to an embodiment.

An embodiment will be described while referring to the drawings. It would be apparent to those skilled in the art that various changes and modifications may be made thereto. For example, an order of steps and processes may be changed arbitrary if such modifications do not depart from the concept of the invention.

FIG. 1 shows a management system 10 according to the embodiment. The management system 10 employs an MDM system to manage printers 14. An administrator of an outside mediation apparatus 12 for managing the printers 14 can use a browser to access an outside mediation apparatus 11 and view management information on the printers 14 stored on the management server 11, or can specify changes or the like to settings information for the printers 14 through the management server 11.

The management system 10 also manages the printers 14 that do not possess a function to communicate directly with the management server 11 (for example, a function to connect to an Internet 15). The management server 11 uses the outside mediation apparatus 12 and the inside mediation apparatuses 13 to manage the printers 14 which do not have a function to communicate directly with the management server 11. The printer 14 is an example of the device in the present disclosure.

The management system 10 is provided with the management server 11 and the outside mediation apparatus 12 that are connected to the Internet 15, and the inside mediation apparatuses 13 and the printers 14 that are connected to local area networks 16. The outside mediation apparatus 12 connected to the Internet 15 and the inside mediation apparatuses 13 connected to local area networks 16 are examples of communication systems.

The management server 11 belongs to a company that provides a service for managing mobile devices (hereinafter referred to as an MDM service), for example. The outside mediation apparatus 12 belongs to a company that uses this MDM service, for example. The inside mediation apparatuses 13 are servers or personal computers deployed at branch offices of the company utilizing the MDM service, for example. The local area networks 16 are configured at each of these company branches, for example. Each branch office possesses one or more printers 14. The printers 14 at each branch are connected to the local area network 16 provided at that branch.

The example in FIG. 1 illustrates three local area networks 16 configured at corresponding branches, and two or three printers 14 connected to each local area network 16. However, the number of local area networks 16 included in the management system 10 and the number of printers 14 connected to each local area network 16 are not limited to the numbers in this example.

The management server 11 and the outside mediation apparatus 12 can communicate with each other through the Internet 15. More specifically, the management server 11 and the outside mediation apparatus 12 each have a global IP address and communicate with each other using the Internet Protocol, which employs global IP addresses.

The local area network 16 is an intranet that is configured of a wired LAN, wireless LAN, WAN, or a combination of these, for example. The inside mediation apparatus 13 and the printers 14 connected to the corresponding local area network 16 can communicate with each other using a communication protocol such as TCP/IP. More specifically, the inside mediation apparatus 13 and the printers 14 communicate with each other using private IP addresses or MAC addresses.

Each local area network 16 has a gateway device (not shown) such as a router. The gateway device has a global IP address and is connected to the Internet 15. The inside mediation apparatus 13 connected to the corresponding local area network 16 communicates with the outside mediation apparatus 12 via the gateway device. Specifically, the inside mediation apparatus 13 and the outside mediation apparatus 12 communicate with each other through a firewall configured by the gateway device. So, the outside mediation apparatus 12 is a mediation apparatus located outside the firewall and the inside mediation apparatus 13 is a mediation apparatus located inside the firewall. In this example, the inside mediation apparatus 13 is a local mediation apparatus located in the local area network 16 for mediating communications between the outside mediation apparatus and a plurality of devices (printers 14) located in the local area network 16, and the outside mediation apparatus 12 is a global mediation apparatus for mediating communications between the management server 11 and the plurality of inside mediation apparatus 13.

The management system 10 uses the outside mediation apparatus 12 and the inside mediation apparatuses 13 having the constructions described above to enable the management server 11 to manage the printers 14 that do not possess a function for communicating directly with the management server 11. Specifically, a first program 24 installed and executed on the outside mediation apparatus 12 and a second program 34 installed and executed on each inside mediation apparatus 13 are used to manage the printers 14 without a function to communicate directly with the management server 11. That is, management by the management server 11 of the printers 14 which are unable to communicate directly with the management server 11 is implemented by the first program 24 and the second program 34. Next, the structures of the outside mediation apparatus 12, the inside mediation apparatuses 13, and the printers 14 will be described in greater detail. The first program 24 and the second program 34 are examples of the programs in the disclosure.

The outside mediation apparatus 12 is provided with a CPU 21, a memory 22, a communication interface 25, a user interface 26, and a communication bus 27. The CPU 21, the memory 22, the communication interface 25, and the user interface 26 are connected to the communication bus 27. The CPU 21 is an example of the first computer. The CPU 21 and the memory 22 are an example of the first control device.

The memory 22 may be configured of ROM, RAM, EEPROM, a hard disk drive, a portable storage medium such as USB memory, or a buffer provided in the CPU 21. The memory 22 may be any storage medium that can be read by a computer. A computer-readable storage medium is a non-transitory medium. In addition to the above example, non-transitory media include CD-ROM and DVD-ROM. A non-transitory medium is also a tangible medium. On the other hand, electric signals that convey programs downloaded from a server or the like on the Internet are a computer-readable signal medium, which is one type of computer-readable medium but is not considered a non-transitory computer-readable storage medium. This description also applies to a memory 32 provided in the inside mediation apparatus 13 described later and a memory 42 provided in the printer 14 described later.

The memory 22 has a program storage area 28, and a data storage area 29. The program storage area 28 stores an operating system (hereinafter, referred to as an OS) 23, a first program 24, and other programs.

The OS 23 is a basic program of the outside mediation apparatus 12. The OS 23 is any operating system such as Mac OS (registered trademark), Windows (registered trademark), Linux (registered trademark), or Android (registered trademark).

The first program 24 controls communications with the management server 11 and the inside mediation apparatuses 13 via the communication interface 25 in cooperation with the OS 23. The first program 24 may be a single program or an aggregate of programs. The process executed by the first program 24 will be described later.

The data storage area 29 stores data required for executing programs. The data storage area 29 also stores a correlation database DB shown in FIG. 2(C).

The correlation database DB correlates a plurality of items for which values (or fields) are registered in each of a plurality of records. The items include "Device ID," "GUID," "Location Information," "Firmware Version," "Settings Information," "Modified Date," and "Condition Information." The correlation database DB may include items other than those described above.

The item "Device ID" specifies an identification information assigned to the printer 14 for identifying the printer 14. The device ID may be a MAC address, an IP address, or a serial number for the printer 14, for example. The device ID is used to differentiate individual records in the correlation database DB. In other words, a single record is generated for each printer 14.

The item "GUID" specifies a globally unique identifier (GUID) assigned to the inside mediation apparatus 13 or the second program 34. That is, the item "GUID" specifies the inside mediation apparatus 13 to which the printer 14 identified by the device ID belongs. "The inside mediation apparatus 13 to which the printer 14 belongs" denotes the inside mediation apparatus 13 that is connected to the same local area network 16 to which the printer 14 is connected. Note that a single second program 34 is installed for each inside mediation apparatus 13. Therefore, the GUID may be identification information assigned to the inside mediation apparatus 13 or the second program 34 for identifying thereof. The GUID is an example of the mediation device ID. Here, numbers, letters, or any other characters or the like capable of identifying the inside mediation apparatus 13 may be used as the GUID. The same is true for the device ID.

The item "Location Information" specifies the local area network 16 to which the inside mediation apparatus 13 designated by the item "GUID" belongs. The item "Location Information" may be a branch name, for example.

The item "Firmware Version" specifies the version of a control program 44 (described later) installed on the printer 14. Larger numbers set for the item "Firmware Version" indicate newer versions.

The item "Settings Information" indicates parameters set for the printer 14. The item "Settings Information" is subdivided into a plurality of items including "Font," "Font Size," and "Density." The item "Font" indicates the font for characters printed by the printer 14. The item "Font Size" indicates the size of characters printed by the printer 14. The item "Density" indicates the density of ink that the printer 14 uses to print text and graphics. In addition to these items, the item "Settings Information" may include other items, such as an item specifying whether the automatic power-off function is enabled or disabled, an item specifying the printing speed, and an item specifying communication parameters.

The item "Modified Date" indicates the date at which content for any item in the record was last modified. The item may include "Modified Date and Time" instead of "Modified Date". In this case, the item "Modified Date and Time" indicates the date and time at which content for any item in the record was last updated.

The item "Condition Information" indicates whether the printer 14 corresponding to the record is under management of the management system 10. For this item, a value "Managing" denotes that the printer 14 is currently under the management of the management system 10, while a value "Waiting" denotes that the printer 14 is not currently under the management of the management system 10.

The communication interface 25 of the outside mediation apparatus 12 shown in FIG. 1 can communicate with the management server 11 and the inside mediation apparatus 13. The communication interface 25 is a LAN interface or a wireless LAN interface. The outside mediation apparatus 12 communicates with the inside mediation apparatus 13 via the communication interface 25, the Internet 15, the firewall (gateway device), the local area network 16, and a communication interface 35 of the inside mediation apparatus 13 described later.

The user interface 26 includes a keyboard, mouse, and the like. The user interface 26 accepts input from the administrator of the outside mediation apparatus 12.

The inside mediation apparatus 13 is provided with a CPU 31, a memory 32, a communication interface 35, a user interface 36, and a communication bus 37. The structures of the CPU 31, the memory 32, the communication interface 35, the user interface 36, and the communication bus 37 are identical to those of the CPU 21, the memory 22, the communication interface 25, the user interface 26, and the communication bus 27. The CPU 31 is an example of the second computer. The CPU 31 and the memory 32 are an example of the second control device.

The memory 32 has a program storage area 38, and a data storage area 39. The program storage area 38 stores programs such as an OS 33, and the second program 34. The data storage area 39 stores data required for executing the programs. The inside mediation apparatus 13 stores a GUID identifying itself in the data storage area 39.

The OS 33 is a basic program for the inside mediation apparatus 13. The second program 34 controls communications with the outside mediation apparatus 12 and the printers 14 via the communication interface 35 in cooperation with the OS 33. The second program 34 may be a single program or an aggregate of programs. The process executed by the second program 34 will be described later.

The communication interface 35 can communicate with the outside mediation apparatus 12 and the printers 14. The communication interface 35 is a LAN interface or a wireless LAN interface.

Each printer 14 is provided with a CPU 41, a memory 42, a communication interface 45, a printing engine 51, and a communication bus 47. The CPU 41, the memory 42, the communication interface 45, and the communication bus 47 have the same structures as the CPU 21, the memory 22, the communication interface 25, and the communication bus 27.

The memory 42 has a program storage area 48, and a data storage area 49. The program storage area 48 stores programs such as an OS 43, and a control program 44. The data storage area 49 stores data required for executing the programs. The printer 41 stores a device ID identifying itself in the data storage area 49. The device ID may be the MAC address, the private IP address, or the serial number of the printer 14, for example.

The OS 43 is a basic program for the printer 14. The control program 44 controls the printing engine 51 to execute printing and controls communications with the inside mediation apparatus 13 via the communication interface 45 in cooperation with the OS 43. The control program 44 may be a single program or an aggregate of programs. The process executed by the control program 44 will be described later.

The communication interface 45 can communicate with the inside mediation apparatus 13. The communication interface 45 receives commands from the inside mediation apparatus 13 and transmits responses to these commands to the inside mediation apparatus 13.

In general, sequence diagrams in this specification depict steps performed by the CPUs 21, 31, and 41 according to instructions described in programs. In other words, actions such as "determine," "extract," "select," "calculate," "decide," "identify," "acquire", "receive", "control," and, "set" the like in the following description represent steps performed by the CPUs 21, 31, and 41. Steps performed by the CPU include processes that control hardware through the OS. "Acquiring" is used as a concept which does not necessarily require a request. That is, a concept represented by "the CPU acquires data" includes a process in which the CPU acquires data without requesting thereof. Further, "data" in this specification represents bit strings that a computer can read. Further, data of different formats are treated as the same data when the content of the data is essentially the same. The same holds true for "information" in this specification. The processes for "command", "response" and "request" are executed by communicating respective information indicating "command", "response", and "request". The words "command", "response", and "request" may respectively indicate information indicating "instruction", "response", and "request". The words "communicate" and "return" may be one example of "transmit".

Further, steps performed by the CPU according to instructions described in a program may be described in abbreviated terms, such as "the CPU 21 executes" or "the first program 24 executes" or "the outside mediation apparatus 12 executes." The same holds true for the CPUs 31 and 41. Similarly, the input and output of information performed by a program via a communication interface or user interface may be described in abbreviated terms, such as "the CPU 21 receives," "the first program 24 transmits," or "the outside mediation apparatus 12 acquires."

Further, a process performed by the CPU to determine whether information A indicates circumstance B may be described conceptually as "determining whether circumstance B based on information A." A process in which the CPU determines whether information A indicates circumstance B or circumstance C may be described conceptually as "determining whether circumstance B or circumstance C based on information A."

The terms "data" and "information" used in this specification share aspects of being bits or bit strings that computers can handle. The computer treats "data" without considering the significance of its individual bits. In the case of "information," on the other hand, the computer's operations branch based on the significance of the individual bits. Additionally, a "command" is a control signal prompting the destination device to perform the next operation. A command may include information and may itself possess the properties of information.

Further, data and information are treated as the same data and information even when the format (such as a text format, binary format, or flag format) is modified for different computers, provided that the computers can recognize the same content. For example, information specifying the number "two" may be stored in one computer as information in the text format for the ASCII code "0x32", and may be stored in a different computer as information in the binary format for the binary notation "10".

However, the distinction between data and information is not strictly enforced; exceptions to the rule may be allowed. For example, data may be temporarily treated as information, while information may be temporarily treated as data. Further, certain bits or bit strings may be treated as data on one device and information on another. Further, information may be extracted from data, and data may be extracted from information.

Further, the phrase "in response to" in this specification indicates that the process specified is to be executed when the condition specified after the phrase has been met. Note that the timing at which the process is executed should be after the condition has been met, but need not be immediately after the condition is met.

Next, processes executed by the first program 24 of the outside mediation apparatus 12, the second program 34 of the inside mediation apparatus 13, and the control program 44 of the printer 14 will be described with reference to FIGS. 3-7. Note that the firewall blocks data transmissions from the outside mediation apparatus 12 to the inside mediation apparatus 13 other than HTTP responses which are responses to the HTTP requests received from the inside mediation apparatus 13. Therefore, when the Internet-side apparatuses located outside the firewall (i.e., the management server 11 and the outside mediation apparatus 12) transmit a request or instruction (i.e., an instruction included in a first command) for the intranet-side apparatuses located inside the firewall (i.e., the inside mediation apparatus 13 and the printer 14) via the firewall, the request or instruction needs to be transmitted as a response to an HTTP request issued by the inside mediation apparatus 13. Hence, in order to enable the request or instruction to be transmitted as a response to an HTTP request, i.e., in order to enable the Internet-side apparatuses to transmit the request or instruction to the intranet-side apparatuses via the firewall, the inside mediation apparatus 13 periodically transmits an HTTP request to the outside mediation apparatus 12 in S36. In other words, in the present embodiment, the inside mediation apparatus 13 performs set-up operations or preparations for enabling the Internet-side apparatuses to transmit the request or instruction to the intranet-side apparatuses via the firewall. However, the set-up operations are not limited to the periodic HTTP request transmissions described above and any method or process can be used provided that the Internet-side apparatuses can transmit the request or instruction to the intranet-side apparatuses via the firewall.

First, the process of recording the device ID of the printer 14 in the correlation database DB stored in the memory 22 of the outside mediation apparatus 12 and initiating management of the printer 14 on the management system 10 will be described with reference to FIGS. 3-7.

Figure 3:
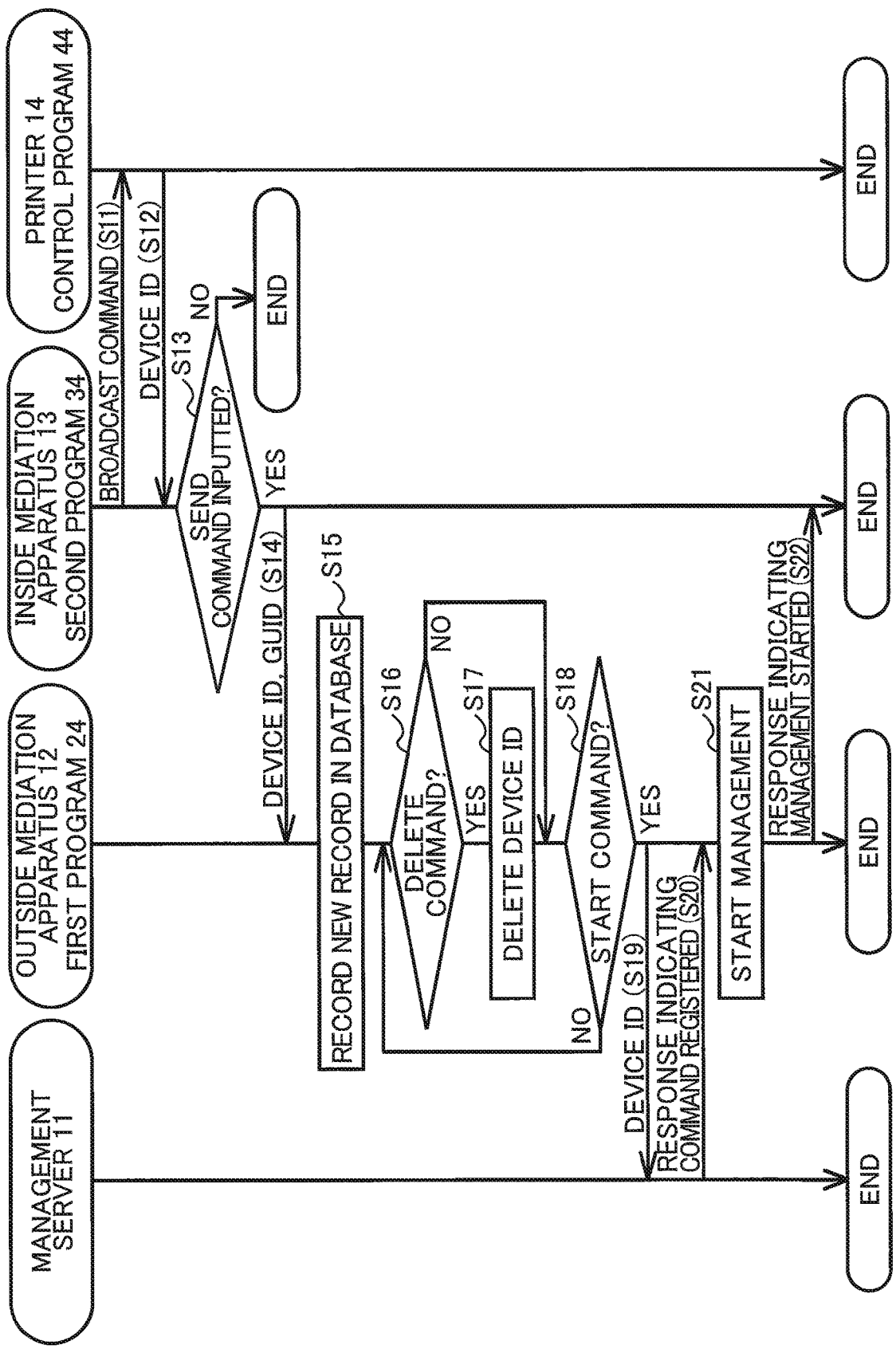
FIG. 3 is a sequence diagram illustrating a process executed by a management server, an outside mediation apparatus, an inside mediation apparatus, and a printer for recording device ID of the printer in the management server.

In S11 of FIG. 3 the second program 34 of the inside mediation apparatus 13 broadcasts a command over the local area network 16 requesting printers 14 to return their device IDs. For example, when the second program 34 is started for the first time, the second program 34 executes an initial setup. During this initial setup, the operator of the inside mediation apparatus 13 may issue a registration command to register printers 14 to be managed on the management system 10. Alternatively, the registration command may be received from the first program 24 of the outside mediation apparatus 12. In response to the registration command, the second program 34 of the inside mediation apparatus 13 broadcasts the command for printers 14 to return their device IDs. The registration command may be a command to add one or more printers 14 to the management system 10 already in existence, i.e., to register one or more printers 14 in the management system 10. The "operator" is a person that manages the printers 14 at the corresponding branch office, for example, and not the administrator that operates the outside mediation apparatus 12. In other words, the operator is a person that manages devices in the local area network 16 such as the printers 14 and the inside mediation apparatus 13 and the administrator is a person that manages devices outside the firewall such as the outside mediation apparatus 12. The process of S11 is an example of the searching steps (or means). As will be described later, the outside mediation apparatus 12 transmits an HTTP response that includes information such as a command to the inside mediation apparatus 13 in response to an HTTP request received from the inside mediation apparatus 13.

In S11 the printers 14 receive this command when the printers 14 are connected to the same local area network 16 over which the second program 34 of the inside mediation apparatus 13 broadcast the command. In S12 the control program 44 of each printer 14 receiving the command returns a response that includes the device ID identifying itself.

In S12 the second program 34 of the inside mediation apparatus 13 receives the response from the control program 44 of the printer 14. In S13 the second program 34 determines whether a send command has been inputted. For example, in response to receiving a response including the device ID of the printer 14, the second program 34 displays this device ID on the display of the inside mediation apparatus 13. The operator determines whether the device ID displayed on the display is the device ID of a printer 14 targeted for management. The operator inputs a send command into the inside mediation apparatus 13 when determining that the device ID displayed on the display is the device ID of a printer 14 targeted for management. However, if the operator determines that the device ID does not belong to a printer 14 targeted for management, the operator inputs a command to delete the device ID. In other words, the operator of the inside mediation apparatus 13 at each branch office confirms whether each device ID collected through the broadcast is the device ID of a printer 14 to be managed with the management system 10.

If the second program 34 of the inside mediation apparatus 13 determines that a command not to send any of the collected device ID was inputted (S13: NO), the second program 34 ends the process without transmitting any of the collected device IDs to the outside mediation apparatus 12. The second program 34 may determine that the command not to send any of the collected device ID was inputted when no send command to send any of the collected device IDs was inputted. However, if a send command was inputted (S13: YES), in S14 the second program 34 transmits an HTTP request to the outside mediation apparatus 12. Here, the second program 34 transmits the HTTP request including the collected device IDs and its own GUID stored in the memory 32. When a plurality of device IDs was collected, each device ID may be transmitted individually to the outside mediation apparatus 12 or all of the collected device IDs may be transmitted together to the outside mediation apparatus 12.

In S14 the outside mediation apparatus 12 receives the HTTP request including device IDs and the GUID from the second program 34 of the inside mediation apparatus 13. In response to receiving the device IDs and the GUID, in S15 the first program 24 of the outside mediation apparatus 12 determines whether each received device ID is already recorded in the correlation database DB, and when not recorded in the correlation database DB, records a new record including the device ID and the GUID in the correlation database DB. The process of S15 is an example of the first storing step or means and the storing process.

Although not indicated in the sequence diagram, the first program 24 of the outside mediation apparatus 12 also returns an HTTP response to the inside mediation apparatus 13 as a response to the HTTP request received in S14. The HTTP response includes information specifying that the device IDs were received. Alternatively, the first program 24 of the outside mediation apparatus 12 may transmit an HTTP response that includes all device IDs that were recorded in the correlation database DB to the inside mediation apparatus 13 as a response to the HTTP request received in S14. In response to receiving the HTTP response that includes all device IDs that were recorded in the correlation database DB, the second program 34 of the inside mediation apparatus 13 stores the device IDs included in this HTTP response in the memory 32. The second program 34 displays the device IDs stored in the memory 32 on the display of the inside mediation apparatus 13 in response to receiving the HTTP response or in response to a command inputted by the operator. Thus, the operator can confirm the device IDs that are recorded in the correlation database DB from the device IDs displayed on the display.

When a new record is added to the correlation database DB, the initial value "Waiting" is stored under the item "Condition Information." In the example of FIG. 2(C), the record for a printer 14 having device ID "008" was newly added. Printers 14 having records whose Condition Information indicates "Waiting" have not yet been registered on the management server 11. These printers 14 are not under the management of the management system 10 and can be said to be in a provisional registration state. The item "Condition Information" in records for printers 14 under management has been changed from "Waiting" to "Managing."

If one of the received device IDs has already been registered in the correlation database DB, the first program 24 of the outside mediation apparatus 12 transmits a response to the inside mediation apparatus 13 indicating that the device ID is already registered.

In S16 the first program 24 of the outside mediation apparatus 12 determines whether a delete command to delete a record was inputted. The delete command may be a command that the administrator inputs on the outside mediation apparatus 12, for example. When a new record is generated, the first program 24 displays information on the display of the outside mediation apparatus 12 indicating that one or more records were generated and recorded in the correlation database DB, for example. When seeing this display, the administrator may instruct the display of the outside mediation apparatus 12 to display the correlation database DB, and determine whether one or more printers 14 having the Condition Information "Waiting" are printers 14 to be targeted for management. The administrator inputs a delete command for one or more device IDs of printers 14 not to be managed with the management system 10. In other words, the operator of each inside mediation apparatus 13 confirms whether each device ID should be recorded in the correlation database DB, and subsequently the administrator of the outside mediation apparatus 12 confirms whether each device ID should be recorded in the correlation database DB. Note that step S13 performed by the second program 34 may be omitted so that only the administrator of the outside mediation apparatus 12 confirms whether device IDs should be recorded in the correlation database DB. In other words, the second program 34 may transmit all device IDs received from printers 14 to the outside mediation apparatus 12 without receiving confirmation from the operator of the inside mediation apparatus 13.

If the first program 24 of the outside mediation apparatus 12 determines that a delete command was inputted (S16: YES), in S17 the first program 24 deletes one or more records designated by the delete command from the correlation database DB. However, if the first program 24 determines that a delete command was not inputted (S16: NO), the first program 24 skips S17.

In S18 the first program 24 determines whether a management start command for initiating management on the management system 10 has been inputted by the operator. When NO determination is made in S18, the first program 24 return to S16. The first program 24 may continue to wait while a management start command was not inputted (S18: NO). When the first program 24 determines that a management start command was inputted (S18: YES), in S19 the first program 24 transmits a command to the management server 11. This command has the device IDs that have been recorded in the correlation database DB as accompanying information. This command also requests the management server 11 to register the accompanying device IDs as device IDs for printers 14 under management. When the first program 24 determines that a management start command was inputted (S18: YES), in S19 the first program 24 may transmit to the management server 11 an HTTP request including a notification indicating that there are one or more new printers 14 which are new targets for management. In this case, the management server 11 transmits, as a response to the HTTP request, an HTTP response indicating that the management server 11 receives the notification. Further, the management server 11 transmits to the first program 24 an HTTP request for requesting the device ID(s) of the new printer(s) 14. In response to the HTTP request, the first program 24 transmits to the management server 11 an HTTP response including the device ID(s). The process of S19 is an example of the registration requesting step or means and the registration request process. The process of S18 for receiving a management start command is an example of the receiving step or means.

Note that the first program 24 of the outside mediation apparatus 12 may also receive an inputted command in S18 declining to initiate management. In this case, the first program 24 performs none of steps S19-22, but performs a process to transmit an HTTP response to the second program 34 of the inside mediation apparatus 13 specifying that the command for declining to initiate management is inputted. In response to receiving this HTTP response, the second program 34 displays information on the display of the inside mediation apparatus 13 specifying that the command declining to initiate management was inputted on the outside mediation apparatus 12. Based on this information displayed on the display, the operator of the inside mediation apparatus 13 can confirm that such a command was inputted on the outside mediation apparatus 12.

In S19 the management server 11 receives the command transmitted from the outside mediation apparatus 12. In response to receiving the command, the management server 11 stores the device IDs included in the command in a memory (not shown). In other words, the management server 11 registers the device IDs included in the command as device IDs for printers 14 under management. In S20 the management server 11 transmits a response to the outside mediation apparatus 12 via the Internet 15 indicating that the device IDs included in the command have been registered.

In S20 the outside mediation apparatus 12 receives the response from the management server 11. In response to receiving this response from the management server 11, in S21 the first program 24 of the outside mediation apparatus 12 starts management on the management system 10. More specifically, the first program 24 changes the "Condition Information" in the database shown in FIG. 2 from "Waiting" to "Managing" for printers having the device IDs included in the command transmitted in S19. The process for changing the "Condition Information" in the database from "Waiting" to "Managing" is an example of the modifying means or step. "Waiting" in the item "Condition Information" is an example of the waiting-state information, and "Managing" in the item "Condition Information" is an example of the management start information or managing-state information.

In S22 the first program 24 transmits an HTTP response to the inside mediation apparatus 13 in response to one of the HTTP requests periodically received from the inside mediation apparatus 13. The HTTP response transmitted to the inside mediation apparatus 13 includes the device IDs in records having the Condition Information "Managing," i.e., the device IDs for printers 14 for which management was initiated. At this time, the first program 24 does not transmit device IDs that were deleted in S17.

Note that the first program 24 of the outside mediation apparatus 12 may also transmit the HTTP response to the inside mediation apparatus 13 in S22 as a response to the HTTP request received in S14. In this case, steps S16 and S17 may be omitted to avoid the occurrence of a timeout.

Although not indicated in the sequence diagram, the second program 34 of the inside mediation apparatus 13 stores device IDs for which management has been initiated in the memory 32 in response to receiving such device IDs in the HTTP response in S22. The operator instructs the display of the inside mediation apparatus 13 to display the device IDs stored in the memory 32. Based on this instruction, the second program 34 displays on the display of the inside mediation apparatus 13 information indicating that device IDs were received for printers 14 for which management has been initiated in order to notify the operator of the information. Accordingly, the operator can confirm the printers 14 for which management has begun by the information on the display. Note that the administrator of the outside mediation apparatus 12 can also confirm the printers 14 for which management has begun by instructing the display of the outside mediation apparatus 12 to display the correlation database DB stored in the memory 22. Additionally, both the operator of the inside mediation apparatus 13 and the administrator of the outside mediation apparatus 12 can confirm printers 14 for which management has begun by using a browser to display data stored on the management server 11 on a display of a device such as a terminal device, a PC and the outside mediation apparatus 12.

In response to an instruction from the management server 11, a command is inputted into each printer 14 having device ID whose record in the correlation database DB has "Managing" in the item "Condition Information". In other words, the management server 11 manages the printers 14. This management will be described in greater detail with reference to FIGS. 4 and 5. Note that the administrator inputs instructions into the management server 11 through a browser.

Figure 4:
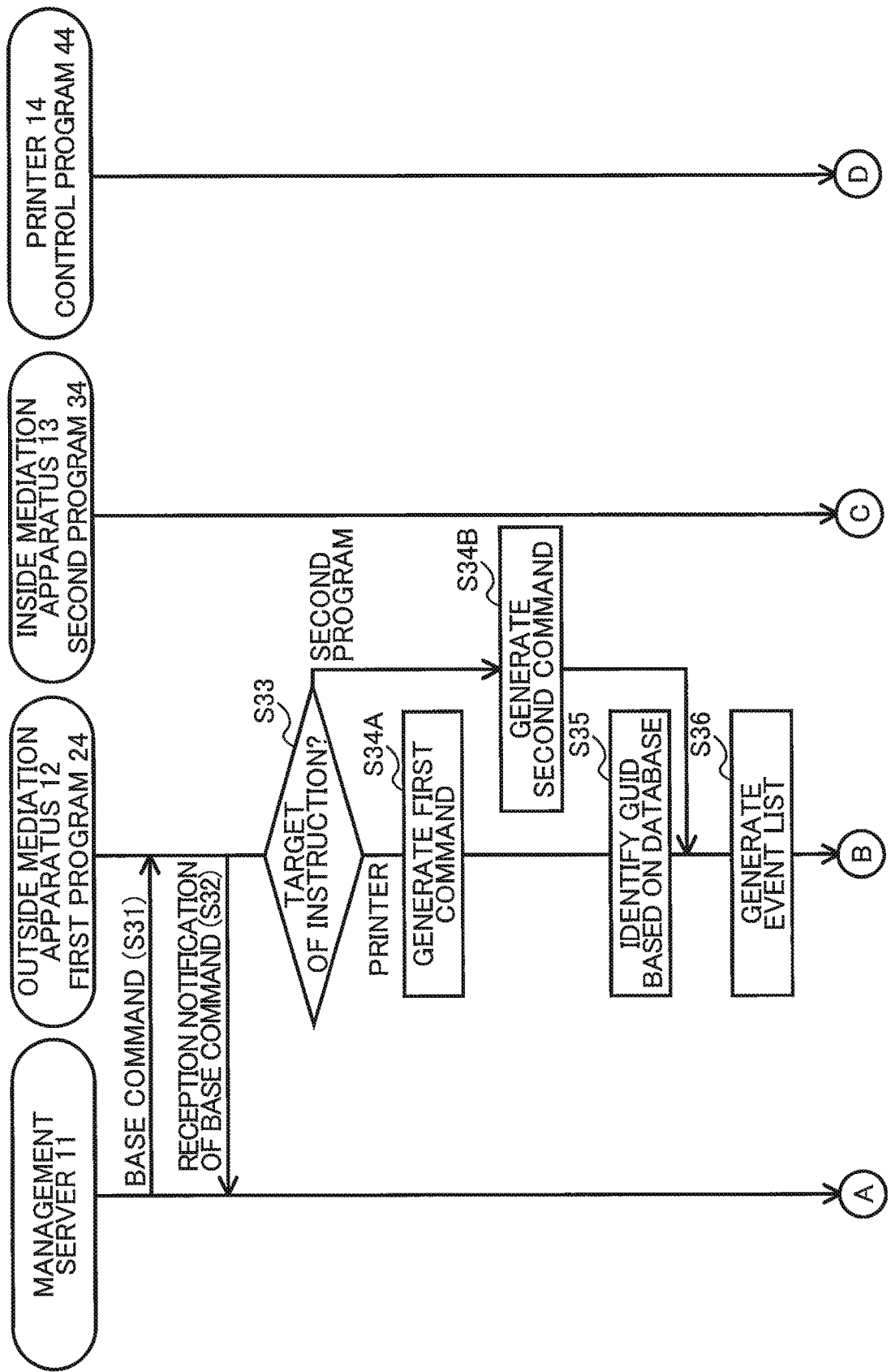
FIG. 4 is a sequence diagram illustrating a part of a process executed by the management server, the outside mediation apparatus, the inside mediation apparatus, and the printer for instructing the printer to execute a base command from the management server.

In S31 at the beginning of FIG. 4, the management server 11 transmits a base command to the outside mediation apparatus 12 via the Internet 15. Base commands are broadly divided between instructions for a printer 14 and instructions for a second program 34. An instruction for a printer 14 may be an instruction for modifying settings in the printer 14 for one of the items "Font," "Font Size," or "Density" under the "Settings Information" (see FIG. 2(C)), an instruction for updating the firmware version for the control program 44 of the printer 14 (see FIG. 2), or an instruction for requesting a printer 14 to return current settings information, for example. When specifying an instruction for a printer 14, the base command has a device ID as accompanying information for identifying the printer 14 that is the subject of the instruction. An instruction for a second program 34 is an instruction to update the version of the second program 34, for example. When the base command specifying an instruction for a second program 34, the base commands has a GUID as accompanying information for identifying the inside mediation apparatus 12 having the second program 34 for which the base command has the instruction. The content specified by the base command is not limited to that described above.

In S31 the first program 24 of the outside mediation apparatus 12 receives the base command from the management server 11. In response to receiving this command, in S32 the first program 24 transmits a notification to the management server 11 indicating that the base command was received. In S33 the first program 24 determines whether the base command received in S31 specifies an instruction for a printer 14, or whether the base command specifies an instruction for the first program 24 that requires the first program 24 to transmit a second command to the second program 34, that is, an instruction for the second program 34. When an instruction for the first program 24 is related to communications between the first program 24 and the management server 11, for example, the first program 24 need not transmit a second command. However, if the instruction for the first program 24 is related to communications with a printer 14, the first program 24 must transmit a second command to the second program 34 since the second program 34 communicates directly with the printers 14.

If the first program 24 of the outside mediation apparatus 12 determines that the base command received from the management server 11 indicates an instruction for a printer 14 (S33: Printer), in S34A the first program 24 generates a first command directing the second program 34 to issue an instruction to the printer 14.

The first command is a command that can be inputted into (or interpreted by) the second program 34 of the inside mediation apparatus 13 and has the device ID for the printer 14 included in the base command as accompanying information.

While not shown in FIG. 2(A) or 2(C), the data storage area 29 in the memory 22 of the outside mediation apparatus 12 stores a first command list. The first command list specifies correlations between base commands and first commands. In S34A the first program 24 of the outside mediation apparatus 12 generates the first command by extracting the first command from the first command list that is associated with the base command received in S31 and by adding the device ID included in the base command to the first command as accompanying information. The first command list also specifies correlations between base commands and second commands.

While not shown in the flowchart, if the base command specifies an instruction to transmit a file to a printer 14, or an instruction to transmit a program file for the second program 34, the first program 24 of the outside mediation apparatus 12 requests the management server 11 to transmit the file. In response to receiving this request, the management server 11 transmits the file to the outside mediation apparatus 12. The first program 24 receives the file and stores the file in the memory 22. When a file is received from the management server 11, in either S34A or S34B the first program 24 generates a command instructing the second program 34 of the inside mediation apparatus 13 to download the file.

After generating the first command in S34A, in S35 the first program 24 identifies the GUID in the correlation database that is associated with the device ID included in the base command. By identifying the GUID, the first program 24 identifies the inside mediation apparatus 13 on the same local area network 16 as the printer 14 to which the instruction is to be transmitted. Specifically, the first program 24 identifies the record in the correlation database having the device ID included in the base command and acquires the corresponding GUID under the item "GUID" in the identified record.

On the other hand, when the first program 24 of the outside mediation apparatus 12 determines in S33 that the base command received in S31 indicates an instruction for the second program 34 (S33: Second Program), in S34B the first program 24 generates a second command directing the second program 34 to execute an instruction for itself. As when generating a first command, the first program 24 uses the first command list stored in the memory 22 to generate the second command. The first program 24 identifies the GUID of the inside mediation apparatus 13 having the second program 34 for which the first command generated.

Note that instructions for the second program 34 may be generated independently from base commands received from the management server 11. For example, the administrator may use the user interface 26 of the outside mediation apparatus 12 to input an instruction for the second program 34. Here, the administrator inputs the GUID of the second program 34 designated to execute the instruction into the outside mediation apparatus 12 together with the inputted instruction. The first program 24 executes a process for creating a second command which is the same process as that beginning from S34B for generating an instruction (second command) for the second program based on the base command received from the management server 11.

The following description will cover a case in which the first program 24 of the outside mediation apparatus 12 has generated one or a plurality of first commands and one or a plurality of second commands to be transmitted to the same inside mediation apparatus 13.

As a result of having generated a plurality of commands including first command(s) and/or second command(s) having the same GUID by performing steps S31-33 S34A, S34B, and S35, a plurality of times, in S36 the first program 24 generates an event list. An event list is a list to be transmitted to the second program 34 of the inside mediation apparatus 13. The event list includes a plurality of event IDs respectively identifying the plurality of commands generated by the first program 24. The event list is correlated with the GUID (the inside mediation apparatus 34) to which the event list is to be transmitted, and includes the plurality of event IDs identifying the plurality of commands having the same GUID. The first program 24 selects event IDs corresponding to the generated commands from a first correlation list shown in FIG. 2(A) and generates an event list that includes the selected event IDs. The first correlation list is pre-stored in the memory 22 of the outside mediation apparatus 12 and indicates correlations between event IDs and first commands and second commands (types of first commands and types of second commands). The first correlation list is an example of the command correlation information.

After generating the event list, the first program 24 waits until an HTTP request periodically transmitted by the inside mediation apparatus 13 has been received.

In the meantime, the second program 34 of the inside mediation apparatus 13 determines in S37 (FIG. 5) whether a transmission timing stored in the memory 32 has arrived and repeatedly performs this determination while the transmission timing has not arrived (S37: NO). The transmission timing is set to an interval of a few seconds to a few tens of seconds, such as a 10-second, 15-second, or 20-second interval. Step S37 is executed repeatedly after YES determination is made in previously executed S37.

If the second program 34 of the inside mediation apparatus 13 determines that the transmission timing has arrived (S37: YES), in S38 the second program 34 transmits an HTTP request including its own GUID to the outside mediation apparatus 12. Here, the outside mediation apparatus 12 can transmit the event list to the inside mediation apparatus 13 through the firewall by including the event list in an HTTP response which is a response to an HTTP request received from the inside mediation apparatus 13. The firewall blocks transmissions from the outside mediation apparatus 12 to the inside mediation apparatus 13 other than HTTP responses which are responses to HTTP requests received from the inside mediation apparatus 13. For this reason, the inside mediation apparatus 13 transmits an HTTP request to the outside mediation apparatus 12 periodically. The process of S37 and S38 for periodically transmitting HTTP requests is an example of the setting up means or step and the setup process. The HTTP request transmitted in S14 may be one of the HTTP requests is transmitted in S38.

In S38 the first program 24 of the outside mediation apparatus 12 receives the HTTP request from the inside mediation apparatus 13. In S39 the first program 24 determines whether the GUID included in the HTTP request matches the GUID of the inside mediation apparatus 13 to which the event list is to be transmitted. In other words, the first program 24 determines whether the GUID included in the HTTP request matches the GUID correlated to the event list.

If the first program 24 determines that the GUID included in the HTTP request received in S38 does not match the GUID of the inside mediation apparatus 13 to which the event list is to be transmitted (S39: NO), in S40 the first program 24 transmits an HTTP response to the inside mediation apparatus 13 that does not include the event list. The HTTP response transmitted in S40 specifies that the HTTP request transmitted in S38 was received.

However, if the first program 24 determines that the GUID included in the HTTP request received in S38 matches the GUID of the inside mediation apparatus 13 to which the event list is to be transmitted (S39: YES), in S41 the first program 24 transmits an HTTP response that includes the event list. The process of S41 for transmitting an HTTP response that includes the event list is an example of the event information transmitting means or step. The event list is an example of the event information.

In S40 or S41 the second program 34 of the inside mediation apparatus 13 receives an HTTP response from the outside mediation apparatus 12. The second program 34 determines whether the HTTP response received from the outside mediation apparatus 12 includes an event list. The second program 34 continues transmitting periodic HTTP requests (S37 and S38) when determining that an event list was not included. When the second program 34 determines that the HTTP response received from the outside mediation apparatus 12 includes an event list, in S42 the second program 34 determines whether the event IDs included in the event list are intended for a printer or for itself (the second program 34) and sorts the event IDs into the categories "for printer" and "for second program."

To describe this in greater detail, a second correlation list shown in FIG. 2(B) is stored in the data storage area 39 of the memory 32 on the inside mediation apparatus 13. The second correlation list specifies correlations between "event IDs," and one of the request categories "for printer" and "for second program." The second program 34 uses the second correlation list stored in the memory 32 to sort the event IDs in the event list into "for printer" and "for second program." In the following description, event IDs identified as "for printer" will be called "first event IDs," while those identified as "for second program" will be called "second event IDs." The second correlation list is an example of the request correlation information. The process in S42 for sorting event IDs into "for printer" and "for second program" is an example of the request determining means or step.

After executing the process in S42, in S43 the second program 34 transmits an HTTP request including one of the first event IDs to the outside mediation apparatus 12 for requesting the command without waiting for the transmission timing for transmitting a periodic HTTP request to arrive. The first event ID is an example of the first request for requesting the return of a first command. The process in S43 for transmitting the first event IDs is an example of the first requesting means or step and the first requesting process.

In S43 the first program 24 of the outside mediation apparatus 12 receives the HTTP request that includes the first event ID. In S44 the first program 24 extracts the first event ID from the HTTP request and identifies the first command corresponding to the extracted first event ID from the first correlation list (see FIG. 2(A)). The first program 24 attaches the device ID of the printer 14 to be subjected to the instruction in the first command to the identified first command. The device ID of the printer 14 to be subjected to the first command is the device ID included in the corresponding base command received in S31. In S45 the first program 24 transmits an HTTP response including the first command with the attached device ID to the inside mediation apparatus 13 as a response to the HTTP request received in S43.

In response to receiving the HTTP response including the first command in S45, in S46 the second program 34 of the inside mediation apparatus 13 transmits an HTTP request to the outside mediation apparatus 12 that includes a reception notification indicating that the first command was received. In other words, the second program 34 notifies the outside mediation apparatus 12 that the first command was received. As described above, the first program 24 of the outside mediation apparatus 12 returns the first command as an HTTP response to an HTTP request received from the inside mediation apparatus 13. Therefore, if the outside mediation apparatus 12 does not receive a reception notification from the inside mediation apparatus 13, the first program 24 of the outside mediation apparatus 12 cannot determine whether the inside mediation apparatus 13 was able to receive the first command until the first program 24 receives a response corresponding to the second command in S55 (described later). In such a case, the time required for the outside mediation apparatus 12 to receive a response corresponding to the first command would exceed the prescribed time which is set as the time interval to wait until re-sending the first command, resulting in the outside mediation apparatus 12 re-sending the first command even if the inside mediation apparatus 13 has already received the first command. In the embodiment, the second program 34 of the inside mediation apparatus 13 transmits the reception notification to the outside mediation apparatus 12 prior to transmitting the response corresponding to the first command (S55). This action prevents the outside mediation apparatus 12 from re-sending the first command despite the inside mediation apparatus 13 having already received the command.

In S46 the first program 24 of the outside mediation apparatus 12 receives the HTTP request that includes the reception notification. While not shown in the sequence diagram, if the first program 24 determines that an HTTP request including a reception notification has not been received within the prescribed time, the first program 24 re-sends the first command to the inside mediation apparatus 13 as an HTTP response to an HTTP request transmitted periodically from the inside mediation apparatus 13. In response to receiving the HTTP request including the reception notification, the first program 24 returns an HTTP response to the inside mediation apparatus 13 indicating that the reception notification was received.

After completing the process of S41, in S42 the second program 34 of the inside mediation apparatus 13 generates a device command to be transmitted to the printer 14. The device command is a command that can be inputted into (or interpreted by) the printer 14 and includes, as a content, instruction information corresponding to the instruction information in the first command.

While not shown in FIG. 1, the data storage area 39 in the memory 32 of the inside mediation apparatus 13 stores a second command list specifying correlations between first commands and device commands. In S47 the second program 34 of the inside mediation apparatus 13 generates the device command by referencing the second command list and extracting from the second command list the device command associated with the first command received in S45.

Figure 5:
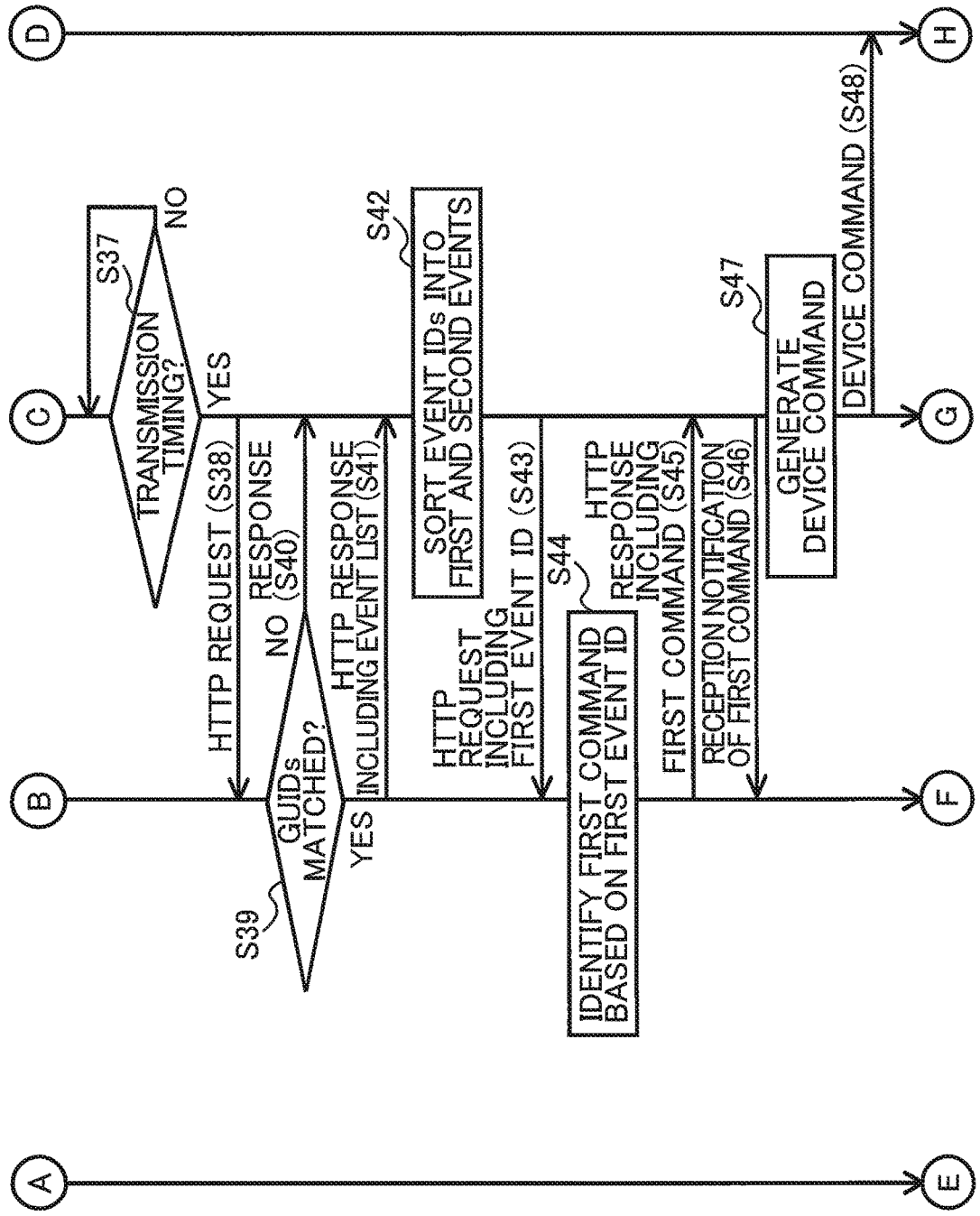
FIG. 5 is a sequence diagram illustrating a part of the process subsequently from the part shown in FIG. 4.
Figure 6:
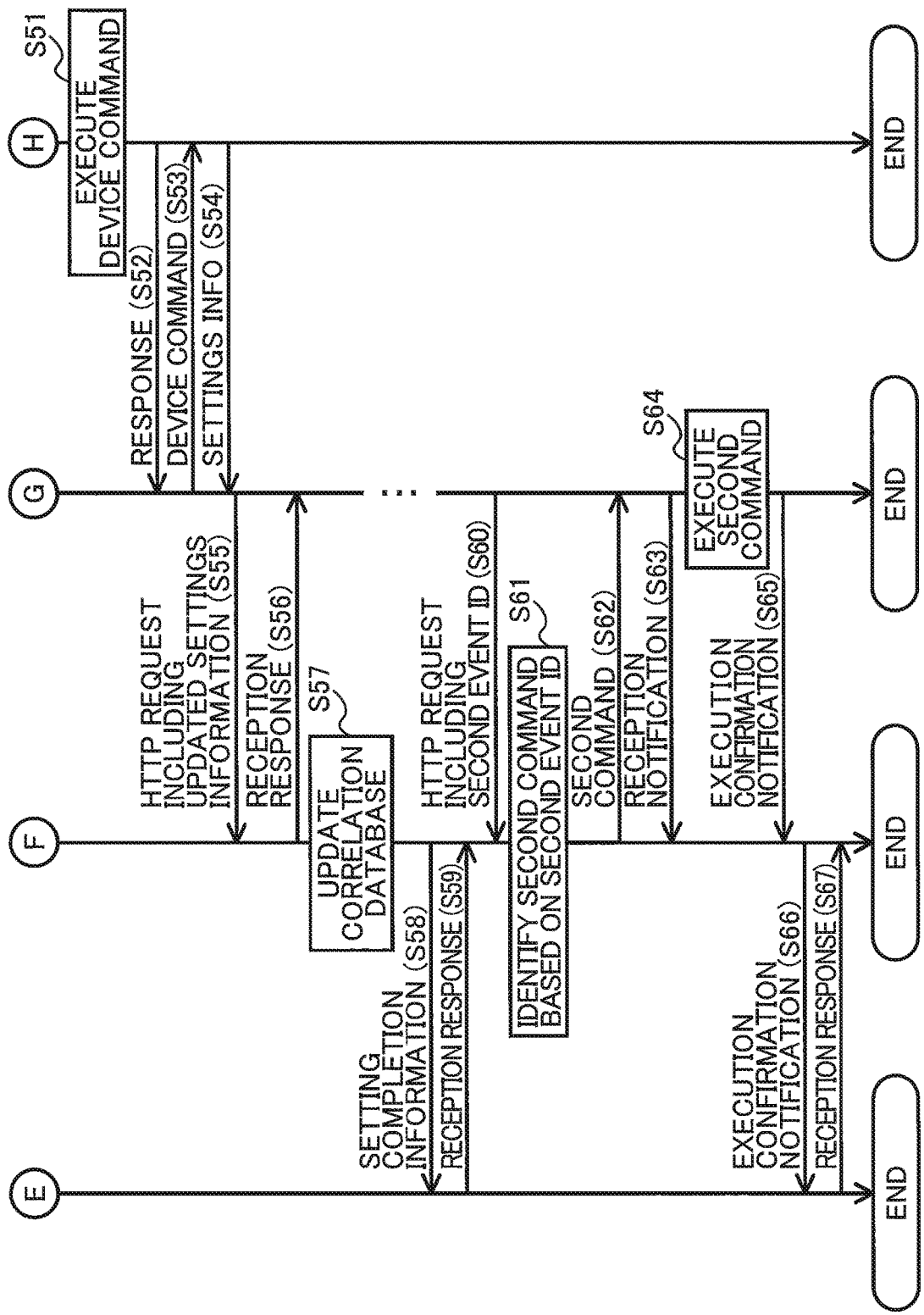
FIG. 6 is a sequence diagram illustrating a final part of the process subsequently from the part shown in FIG. 5.
Figure 7:
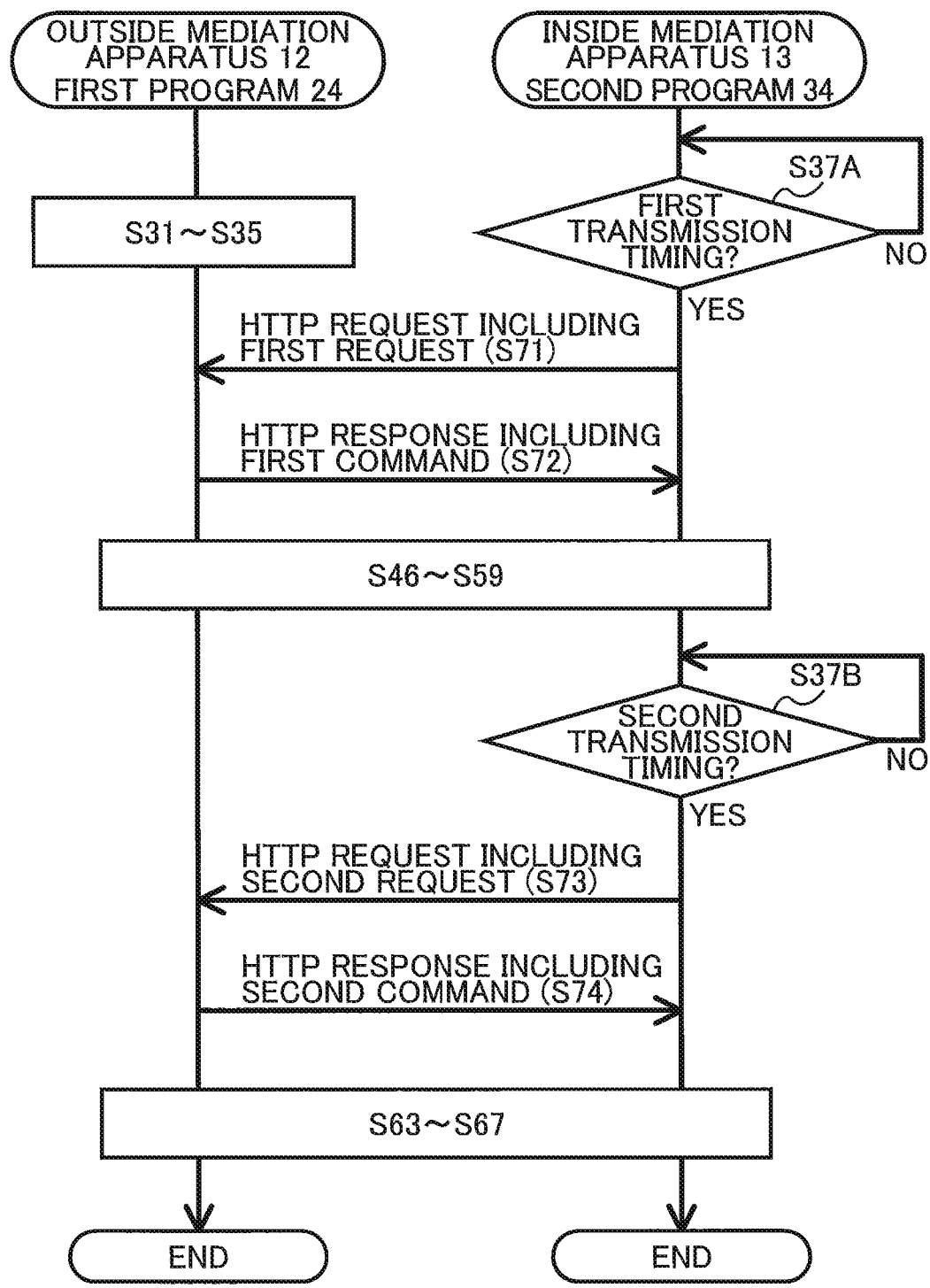
FIG. 7(A) is a sequence diagram illustrating a process according to a first variation.
FIG. 7(B) is a sequence diagram illustrating a process according to a second variation.
Figure 7:
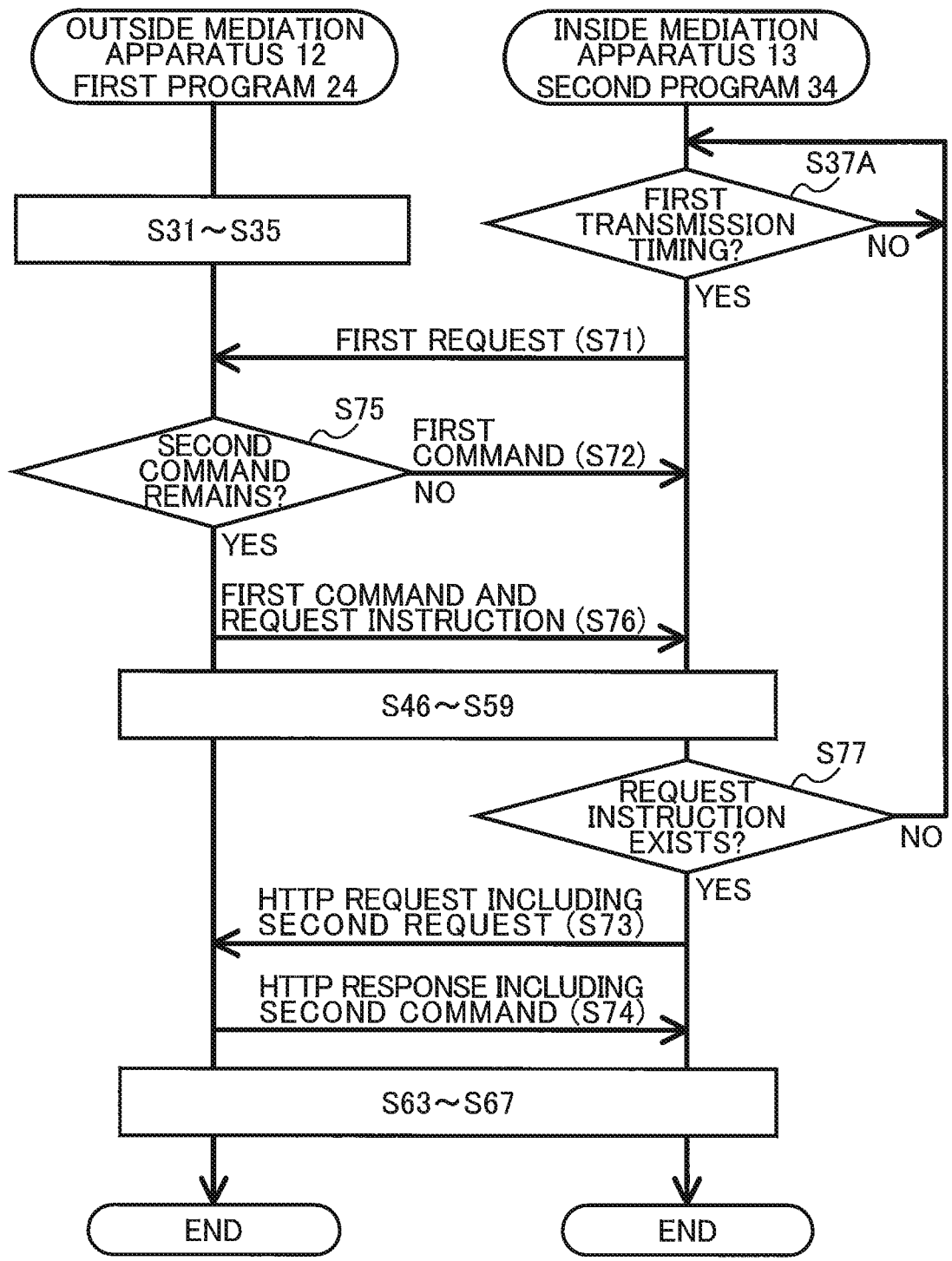

While not shown in the sequence diagram of FIG. 5, the second program 34 of the inside mediation apparatus 13 transmits an HTTP request that includes a file transmission request to the outside mediation apparatus 12 when the first command (specifically, the instruction information of the first command) received in S45 instructs the downloading of a file. In response to receiving this HTTP request, the first program 24 of the outside mediation apparatus 12 transmits an HTTP response including the file to the inside mediation apparatus 13 according to the transmission request included in the HTTP request. The second program 34 of the inside mediation apparatus 13 receives the file included in this HTTP response. The second program 34 generates a device command that includes the settings or programs in the received file. Alternatively, the device command may include the received file. The file may be included in the first command, and the first command having the file may be transmitted from the first program 24 to the second program 34. In this case, the second program 34 need not transmit a file transmission request to the first program 24.

The second program 34 of the inside mediation apparatus 13 may determine based on a settings request flag attached to the first command whether the instruction specified by the first command received in S45 is an instruction to acquire settings information, or other instructions such as an instruction to modify settings information and an instruction to update the firmware version. For example, if the base command received in S31 has an instruction to request settings information, the first program 24 of the outside mediation apparatus 12 attaches a settings request flag set to ON to the first command.

After generating the device command, in S48 the second program 34 transmits this device command to the device ID attached to the first command. The process of S48 for transmitting a device command to a printer 14 is an example of the device command transmitting means or step and the device command transmission process.

In S48 the printer 14 receives the device command from the inside mediation apparatus 13. In S51 the control program 44 of the printer 14 executes the instruction specified by the device command (specifically, the instruction information of the device command). For example, if the device command specifies an instruction to modify a setting in the printer 14 for each of the items in the settings information, including "Font," "Font Size," and "Density" (see FIG. 2), the control program 44 modifies the setting for each of "Font," "Font Size," and "Density" to a value included in the device command. If the device command is an instruction to update the firmware version, the control program 44 updates itself using the program included in the device command. If the device command is an instruction requesting that settings information be returned, in S52 the control program 44 returns the settings information of the printer 14 as a response to the device command.

In S52 the control program 44 of the printer 14 transmits a response to the inside mediation apparatus 13 indicating that the instruction specified by the device command was executed.

When the second program 34 of the inside mediation apparatus 13 receives the response from the printer 14 in S52, in S53 the second program 34 transmits a command (device command) to the printer 14 requesting the return of settings information. Note that the second program 34 skips steps S53 and S54 when the device command transmitted in S48 is an instruction requesting the return of settings information from the printer 14.

In response to receiving the command in S53 requesting the return of settings information, in S54 the control program 44 of the printer 14 returns the settings information.

After receiving the settings information in S54, in S55 the second program 34 of the inside mediation apparatus 13 transmits an HTTP request including the updated settings information to the outside mediation apparatus 12 as a response to the first command received in S45. The process of S55 for transmitting an HTTP request that includes settings information is an example of the first responding means or step and the first response process.

In S55 the first program 24 of the outside mediation apparatus 12 receives the updated settings information as a response to the first command. The updated settings information indicates modified settings of the printer 14 when the first command specifies an instruction to modify a setting in the printer 14. In response to receiving the HTTP request that includes settings information, in S56 the first program 24 transmits an HTTP response to the inside mediation apparatus 13 indicating that the HTTP request was received. Further, after receiving the settings information, in S57 the first program 24 overwrites the settings, firmware version, and other settings information in the correlation database (see FIG. 2(C)) with the updated settings information.

In S58 the first program 24 of the outside mediation apparatus 12 generates setting completion information that includes the updated settings information received in S55 and information indicating that the printer 14 executed the instruction specified by the base command, and transmits this setting completion information to the management server 11 as a response to the base command received in S31. The setting completion information is a command that can be inputted into (interpreted by) the management server 11 and has the settings information as accompanying information, for example.

The first program 24 of the outside mediation apparatus 12 may also transmit the settings information received in S55 to the management server 11 separately from the setting completion information. In other words, the information indicating that settings were performed and settings information obtained after the settings were performed may be transmitted separately to the management server 11.

After receiving the setting completion information via the Internet 15 in S58, in S59 the management server 11 transmits a reception response to the outside mediation apparatus 12 indicating that the setting completion information was received. The first program 24 of the outside mediation apparatus 12 receives the reception response from the management server 11 in S59. After executing S57, the first program 24 may transmit to the management server 11 an HTTP request including a notification indicating that settings of the printer 14 is modified. In this case, the management server 11 transmits, as a response to the HTTP request, an HTTP response indicating that the management server 11 receives the notification. Further, the management server 11 transmits to the first program 24 an HTTP request for requesting modified settings of the printer 14, that is, the settings information received in S55. In response to the HTTP request, the first program 24 transmits to the management server 11 an HTTP response including the modified settings (the settings information).

In the meantime, after receiving the HTTP response in S45 that includes the first command, if the event list includes a plurality of first event IDs, the second program 34 of the inside mediation apparatus 13 transmits an HTTP request that includes another first event ID included in the event list to the outside mediation apparatus 12 without waiting for the transmission timing to arrive. Thereafter, the first program 24 of the outside mediation apparatus 12 and the second program 34 of the inside mediation apparatus 13 execute the process in S43 through S59 as described above for another first event ID. The second program 34 executes the process in S43 for all first event IDs included in the event list. That is, the process in S43 through S59 are repeated for each of the plurality of first event IDs in the event list.

After the second program 34 has executed the process in S43 on all first event IDs included in the event list, in S60 the second program 34 transmits an HTTP request including a second event ID to the outside mediation apparatus 12 without waiting for the transmission timing. The second event ID is an example of the second request requesting the return of a second command. The process of S60 for transmitting an HTTP request including a second event ID is an example of the second requesting means or step and the second requesting process.

In response to receiving the HTTP request in S60 that includes a second event ID, in S61 the first program 24 of the outside mediation apparatus 12 extracts the second command from the first correlation list (see FIG. 2(A)) that is associated with the second event ID included in the HTTP request. In S62 the first program 24 transmits an HTTP response that includes the extracted second command to the inside mediation apparatus 13 as a response to the HTTP request received in S60. The second command may include a command instructing the second program 34 to download an execution file, such as a program file for the second program 34.

In response to receiving the HTTP response that includes the second command in S62, in S63 the second program 34 of the inside mediation apparatus 13 transmits an HTTP request to the outside mediation apparatus 12 that includes a reception notification indicating that the second command was received. While not shown in the flowchart, the first program 24 also transmits an HTTP response to the inside mediation apparatus 13 after receiving the HTTP request including a reception notification to indicate that the reception notification was received.

Also after receiving the HTTP response including the second command in S62, in S64 the second program 34 executes the instruction indicated by the second command. This instruction is referred to as the execution process. For example, in S64 the second program 34 requests the inside mediation apparatus 13 to transmit the program file specified in the second command, receives this program file from the inside mediation apparatus 13, and updates itself with the program file received from the inside mediation apparatus 13. The execution process of S64 in which the second program 34 executes the instruction specified in the second command is an example of the executing means or step.

In S65 the second program 34 transmits an HTTP request to the outside mediation apparatus 12 as a response to the second command received in S62. The HTTP request includes an execution confirmation notification indicating that the execution process was executed. The process of S65 for transmitting an HTTP request with the execution confirmation notification to the outside mediation apparatus 12 is an example of the second responding means or step and the second responding process.

In response to receiving the HTTP request with an execution confirmation notification in S65, in S66 the first program 24 transmits an HTTP request including the execution confirmation notification to the management server 11 in response to the base command received in S31. Note that the administrator may also directly input an instruction in the outside mediation apparatus 12 using the user interface 26, and the outside mediation apparatus 12 may generate a second command based on this inputted instruction. In this case, the first program 24 skips the process of S66 and S67. Another possible implementation would eliminate the process of S66 and S67 entirely.

After receiving the HTTP request in S66 that includes the execution confirmation notification, in S67 the management server 11 transmits an HTTP response to the external mediation device 12 indicating that the execution confirmation notification was received. After executing S65, the first program 24 may transmit to the management server 11 an HTTP request including a notification indicating that an instruction based on the base command is complete in the execution process. In this case, the management server 11 transmits, as a response to the HTTP request, an HTTP response indicating that the management server 11 receives the notification. Further, the management server 11 transmits to the first program 24 an HTTP request for requesting detailed information on a result of the execution process. In response to the HTTP request, the first program 24 transmits to the management server 11 an HTTP response including the detailed information on the result of the execution process. In this case, the first program 24 may receive the detailed information from the second program 34 together with the execution confirmation notification. The detailed information may include a version of the program file which was used in S64.

In the meantime, after receiving the HTTP response in S62 that includes the second command, if the event list includes a plurality of second event IDs, the second program 34 of the inside mediation apparatus 13 transmits an HTTP request that includes another second event ID included in the event list to the outside mediation apparatus 12 without waiting for the transmission timing to arrive. Thereafter, the first program 24 of the outside mediation apparatus 12 and the second program 34 of the inside mediation apparatus 13 execute the process in S60 through S67 as described above for another second event ID. The second program 34 executes the process in S60 for all second event IDs included in the event list. That is, the process in S60 through S67 are repeated for each of the plurality of first event IDs in the event list.

Effects of the Embodiment

In the embodiment, an instruction from the management server 11 is inputted into (or interpreted by) the printer 14 by the first program 24 of the outside mediation apparatus 12 and the second program 34 of the inside mediation apparatus 13. Accordingly, the management server 11 is capable of managing printers 14 that do not have a function for connecting to the Internet 15. That is, the MDM system can be used to manage printers 14 not possessing a function to connect to the Internet 15.

In the embodiment, the second program 34 of the inside mediation apparatus 13 transmits to the outside mediation apparatus 12 an HTTP request that includes either a first event ID requesting the outside mediation apparatus 12 to return a first command specifying an instruction for a printer 14, or a second event ID requesting the outside mediation apparatus 12 to return a second command specifying an instruction for the second program 34. Next, the second program 34 processes the command (instruction) included in the response to the first event ID as a command for the printer 14 or processes the command (instruction) included in a response to the second event ID as a command for itself. Accordingly, the second program 34 can process the command included in an HTTP response without determining whether the command specifies an instruction for the printer 14 or an instruction for itself (without classifying the command).

In the embodiment, the first program 24 of the outside mediation apparatus 12 transmits an event list to the inside mediation apparatus 13 that includes a plurality of event IDs, and the second program 34 of the inside mediation apparatus 13 transmits HTTP requests including one event ID to the outside mediation apparatus 12 separately from the periodically transmitted HTTP requests. Therefore, the time required to complete execution of instructions specified by base commands is shorter with this method than when the first program 24 transmits commands to the inside mediation apparatus 13 by including the commands one at a time in HTTP responses to periodically received HTTP requests. In other words, use of the event list can reduce the execution time for processes on the management system 10. Hence, the use of an event list to reduce the execution time for processes in the embodiment enables the second program 34 to process commands (instructions) without determining the type of command First Variation The embodiment describes a case in which the second program 34 processes commands using an event list without determining the type of the command. This variation describes a case in which the second program 34 processes commands without the use of an event list and without determining the type of command. This variation will be described with reference to FIG. 7(A), wherein similar steps to the embodiment are designated with the same step numbers. Structures and processes other than those described below are identical to those in the embodiment.

As in the embodiment, the first program 24 of the outside mediation apparatus 12 executes the process from S31 through S35, generating first commands and second commands according to the inputted base commands (S34A, S34B) and, after generating a first command, identifies the GUID of the inside mediation apparatus 13 to which the command is to be transmitted (S35). Next, the first program 24 waits until an HTTP request transmitted periodically by the inside mediation apparatus 13 is received.

In the meantime, the second program 34 of the inside mediation apparatus 13 determines in S37A whether a first transmission timing has arrived and determines in S37B whether a second transmission timing has arrived. The first transmission timing is the timing for transmitting an HTTP request that includes a first request for requesting a first command, and the second transmission timing is the timing for transmitting an HTTP request that includes a second request for requesting a second command. If the second program 34 determines in S37A that the first transmission timing has arrived (S37A: YES), in S71 the second program 34 transmits an HTTP request including the first request to the outside mediation apparatus 12. Similarly, if the second program 34 determines in S37B that the second transmission timing has arrived (S37B: YES), in S73 the second program 34 transmits an HTTP request including a second request to the outside mediation apparatus 12. Steps S37A is executed repeatedly and thus S37B is executed repeatedly after YES determination is made in previously executed S37B. The inside mediation apparatus 13 transmits an HTTP request in S71 each time the first transmission timing has arrived, and thus the HTTP request is transmitted periodically. Similarly, the inside mediation apparatus 13 transmits an HTTP request in S73 each time the second transmission timing has arrived, and thus the HTTP request is transmitted periodically. The process of S37A for determining whether the first transmission timing has arrived is an example of the first transmission determining means or step. The process of S37B for determining whether the second transmission timing has arrived is an example of the second transmission determining means or step.

In response to receiving an HTTP request that includes a first request in S71, in S72 the first program 24 of the outside mediation apparatus 12 transmits an HTTP response that includes a first command to the inside mediation apparatus 13 as a response to this HTTP request. In response to receiving the HTTP response that includes the first command, the second program 34 of the inside mediation apparatus 13 executes the process in S46-S59 described in the embodiment. If there is no first command, in S72 the first program 24 may transmit an HTTP response having information for indicating that there is no first command.

In response to receiving an HTTP request that includes a second request in S73, in S74 the first program 24 of the outside mediation apparatus 12 transmits an HTTP response that includes a second command to the inside mediation apparatus 13 as a response to this HTTP request. After receiving the HTTP response that includes the second command, the second program 34 of the inside mediation apparatus 13 executes the process in S63-S67, as described in the embodiment. If there is no second command, in S72 the first program 24 may transmit an HTTP response having information for indicating that there is no second command Effects of the First Variation In this variation, the second program 34 of the inside mediation apparatus 13 transmits an HTTP request that includes a first request for requesting a first command and processes the command (instruction) included in the HTTP response received in response to the transmitted HTTP request as a first command specifying an instruction for a printer 14. Additionally, the second program 34 transmits an HTTP request that includes a second request for requesting a second command and processes the command (instruction) included in the HTTP response received as a response to the transmitted HTTP request as a second command specifying an instruction for itself (the second program 34). Hence, the second program 34 can process commands included in HTTP responses without having to determine whether the command specifies an instruction for a printer 14 or an instruction for itself.

Note that the interval for periodically transmitting HTTP requests including a first request and the interval for periodically transmitting HTTP requests including a second request may be the same or different in this variation.

Second Variation

The first variation describes a case in which HTTP requests including first requests are periodically transmitted and HTTP requests including second requests are periodically transmitted. The second variation describes a case in which only HTTP requests that include first requests are periodically transmitted. This second variation will be described with reference to FIG. 7(B). Note that structural parts and process steps identical to those in the embodiment and the first variation are designated with the same part numbers and step numbers to avoid duplicating descriptions. The structures and processes not described below are identical to those in the embodiment and first variation described above.

As in the embodiment, the first program 24 of the outside mediation apparatus 12 executes the process in steps S31 through S35, generating first commands and second commands according to the inputted base commands (S34A, S34B), and identifying the GUID of the inside mediation apparatus 13 to which the command is to be transmitted (S35). Subsequently, the first program 24 waits until an HTTP request periodically transmitted by the inside mediation apparatus 13 is received.

In the meantime, in S37A the second program 34 of the inside mediation apparatus 13 determines whether a first transmission timing for transmitting an HTTP request that includes a first request for requesting a first command has arrived. When the second program 34 determines that the first transmission timing has arrived (S37A: YES), in S71 the second program 34 transmits an HTTP request including a first request to the outside mediation apparatus 12. The process of S37A for determining whether the first transmission timing has arrived is an example of the transmission determining means or step.

In response to receiving the HTTP request including a first request in S71, in S75 the first program 24 of the outside mediation apparatus 12 determines whether there remain any second commands that have not yet been transmitted. If the first program 24 determines that there are no second commands left to be transmitted (S75: NO), in S72 the first program 24 transmits an HTTP response that includes a first command to the inside mediation apparatus 13 in response to the HTTP request received in S71.

However, if the first program 24 determines that there remain second commands to be transmitted (S75: YES), in S76 the first program 24 of the outside mediation apparatus 12 of the first program 24 transmits an HTTP response that includes the generated first command and a request instruction requesting the transmission of an HTTP request including a second request to the inside mediation apparatus 13 in response to the HTTP request received in S71. The request instruction is an example of the instruction for executing the second requesting means or step. If there is no first command, in S76 the first program 24 may transmit an HTTP response that includes the request instruction only.

In response to receiving an HTTP response that includes a first command (S72, S76), the second program 34 of the inside mediation apparatus 13 executes the process in S46-S59 described in the embodiment. In S77 the second program 34 determines whether the HTTP response received from the outside mediation apparatus 12 includes a request instruction. If the second program 34 determines that the HTTP response does not include a request instruction (S77: NO), the second program 34 continues transmitting periodic HTTP requests that include a first request (S37A, S71). However, if the second program 34 determines that a request instruction is included in the HTTP response (S77: YES), in S73 the second program 34 transmits an HTTP request to the outside mediation apparatus 12 that includes a second request requesting a second command.

When receiving an HTTP request in S73 that includes a second request, in S74 the first program 24 of the outside mediation apparatus 12 transmits an HTTP response including a second command to the inside mediation apparatus 13 in response to the HTTP request received in S73.

In response to receiving the HTTP response including the second command in S74, the second program 34 of the inside mediation apparatus 13 executes the process in S63-S67 described in the embodiment.

Effects of the Second Variation

In the second variation, the second program 34 of the inside mediation apparatus 13 transmits an HTTP request that includes a first request and processes the command (instruction) included in the HTTP responses received in response to the transmitted HTTP request as a first command specifying an instruction for a printer 14. Further, when an HTTP response received from the outside mediation apparatus 12 includes a request instruction requesting the transmission of an HTTP request including a second request, the second program 34 transmits an HTTP request that includes a second request for requesting a second command. Subsequently, the second program 34 processes the command (instruction) included in the HTTP response received as a response to the transmitted HTTP request as a second command specifying an instruction for itself (the second program 34). Accordingly, the second program 34 can process commands included in HTTP responses without determining whether the command included in the HTTP response specifies an instruction for a printer 14 or an instruction for itself.

Further, since the second program 34 does not periodically transmit HTTP requests including second requests in this variation, the transmission interval for HTTP requests including first requests can be made shorter than that in the first variation, thereby increasing the processing speed for first commands That is, this variation can achieve better processing speed in the management system 10 than the first variation.

Third Variation

The embodiment describes a case in which HTTP requests including first event IDs and HTTP requests including second event IDs are both transmitted to the outside mediation apparatus 12. The third variation describes a case in which HTTP requests including A-type first event IDs, HTTP requests including B-type first event IDs, and HTTP requests including second event IDs are all transmitted to the outside mediation apparatus 12. The A-type first event IDs are an example of A-type first requests, and the B-type first event IDs are an example of the B-type first requests.

An A-type first event ID specifies an A-type first command that requires the control program 44 of the printer 14 to be restarted. A B-type first event ID specifies a B-type first command that does not require the control program 44 of the printer 14 to be restarted.

More specifically, modifications of settings information on the printer 14 are broadly classified as modifications accompanied by a restart of the control program 44 and modifications not accompanied by a restart. The control program 44 of the printer 14 executes a restart when determining that settings information (settings values) for a prescribed item among the Settings Information (see FIG. 2(C)) has been modified. For example, the memory 42 of the printer 14 may store a table correlating certain items of Settings Information with the execution of a restart. The control program 44 uses the table stored in the memory 42 to determine whether settings information is correlated with the execution of a restart and executes the restart when determining that settings information associated with the execution of a restart has been modified.

The first correlation list stored in the memory 22 of the outside mediation apparatus 13 further indicates correlations between event IDs and both the A-type and B-type first commands.

Similarly, the second correlation list stored in the memory 32 of the inside mediation apparatus 13 further specifies correlations between event IDs and both A-type first event IDs and B-type first event IDs.

Next, the process executed by the first program 24 of the outside mediation apparatus 12 and the second program 34 of the inside mediation apparatus 13 in the third variation will be described with reference to FIG. 8(A).

As in the embodiment, the first program 24 of the outside mediation apparatus 12 and the second program 34 of the inside mediation apparatus 13 execute the process from S31 through S41.

In S81 the second program 34 of the inside mediation apparatus 13 uses the second correlation list stored in the memory 32 to sort each of the event IDs in the event list included in the HTTP response received in S41 into one of the A-type first event ID, the B-type first event ID, and the second event ID. In S82 the second program 34 transmits an HTTP request including one of the B-type first event IDs to the outside mediation apparatus 12.

In response to receiving the HTTP request including a B-type first event ID in S82, in S83 the first program 24 of the outside mediation apparatus 12 uses the B-type first event ID included in the HTTP request and the first correlation list stored in the memory 22 to identify the B-type first command. Further, the first program 24 transmits an HTTP response that includes the identified B-type first command to the inside mediation apparatus 13 as a response to the HTTP request received in S82.

When the second program 34 of the inside mediation apparatus 13 receives the HTTP response including a B-type first command in S83, the second program 34 executes the process in S46-S59 described in the embodiment. Note that the control program 44 of the printer 14 that receives the device command transmitted in S48 performs a modification of settings information in S51 without an accompanying restart.

In the meantime, after receiving the HTTP response in S83 that includes the B-type first command, if the event list includes a plurality of B-type first event IDs, the second program 34 of the inside mediation apparatus 13 transmits an HTTP request that includes another B-type first event ID included in the event list to the outside mediation apparatus 12. Thereafter, the first program 24 of the outside mediation apparatus 12 and the second program 34 of the inside mediation apparatus 13 execute the process in S46 through S59 as described above for another B-type first event ID. The second program 34 executes the process in S82 for all B-type first event IDs included in the event list. That is, the process in S82, S83, and S46-S59 are repeated for each of the plurality of B-type first event IDs in the event list.

In S84 the second program 34 of the inside mediation apparatus 13 transmits an HTTP request including an A-type first event ID to the outside mediation apparatus 12.

In response to receiving the HTTP request including an A-type first event ID in S84, in S85 the first program 24 of the outside mediation apparatus 12 uses the A-type first event ID included in the HTTP request and the first correlation list stored in the memory 22 to identify the A-type first command. Further, the first program 24 transmits an HTTP response that includes the identified A-type first command to the inside mediation apparatus 13 as a response to the HTTP request received in S84.

When the second program 34 of the inside mediation apparatus 13 receives the HTTP response including an A-type first command in S85, the second program 34 executes the process in S46-S59 described in the embodiment. Note that the control program 44 of the printer 14 that receives the device command transmitted in S48 performs a modification of settings information in S51 with an accompanying restart.

In the meantime, after performing the modification in S51, if the event list includes a plurality of B-type first event IDs, the second program 34 of the inside mediation apparatus 13 transmits an HTTP request that includes another A-type first event ID included in the event list to the outside mediation apparatus 12. Thereafter, the first program 24 of the outside mediation apparatus 12 and the second program 34 of the inside mediation apparatus 13 execute the process in S46 through S59 as described above for another A-type first event ID. The second program 34 executes the process in S84 for all A-type first event IDs included in the event list. That is, the process in S84, S85, and S46-S59 are repeated for each of the plurality of A-type first event IDs in the event list.

After performing the process in S84, S85, and S46-S-59 for all the plurality of A-type first event IDs, in S86 the second program 34 transmits an HTTP request that includes a second event ID to the outside mediation apparatus 12.

When the first program 24 of the outside mediation apparatus 12 receives the HTTP request including a second event ID in S86, in S87 the first program 24 uses the second event ID included in the HTTP request and the first correlation list stored in the memory 22 to identify the second command. Further, the first program 24 transmits an HTTP response including the identified second command to the inside mediation apparatus 13 as a response to the HTTP request received in S86.

In response to receiving the HTTP response including the second command in S87, the second program 34 of the inside mediation apparatus 13 executes the process in S63-S67 described in the embodiment.

In the meantime, after receiving the HTTP response in S87 that includes the second command, if the event list includes a plurality of second event IDs, the second program 34 of the inside mediation apparatus 13 transmits an HTTP request that includes another second event ID included in the event list to the outside mediation apparatus 12. Thereafter, the first program 24 of the outside mediation apparatus 12 and the second program 34 of the inside mediation apparatus 13 execute the process in S87 and S63 through S67 as described above for another second event ID. The second program 34 executes the process in S86 for all second event IDs included in the event list. That is, the process in S86, S87, and S63 through S67 are repeated for each of the plurality of first event IDs in the event list.

Effects of the Third Variation

In the third variation, the second program 34 of the inside mediation apparatus 13 transmits an HTTP request that includes an A-type first event ID and processes the command (instruction) included in the HTTP response received in response to this HTTP request as a first command accompanying a restart. Further, the second program 34 transmits an HTTP request that includes a B-type first event ID and processes the command (instruction) included in the HTTP response received in response to this HTTP request as a first command not accompanying a restart. Further, the second program 34 transmits an HTTP request that includes a second event ID and processes the command (instruction) included in the HTTP response received in response to this HTTP request as a second command for itself (the second program 34). Hence, the second program 34 can process commands included in HTTP responses without determining whether the command in the HTTP response specifies an instruction for the printer 14 that requires a restart, an instruction for the printer 14 that does not require a restart, or an instruction for itself.

In the third variation described above, the second program 34 first transmits HTTP requests that include B-type first event IDs, then HTTP requests that include A-type first event IDs, and subsequently transmits HTTP requests that include second event IDs. However, the order in which the A-type first event IDs, the B-type first event IDs, and the second event IDs are transmitted may be random. The first program 24 of the outside mediation apparatus 12 transmits an A-type first command when the event ID included in the HTTP request is an A-type first event ID, transmits a B-type first command when the event ID included in the HTTP request is a B-type first event ID, and transmits a second command when the event ID included in the HTTP request is a second event ID. In the meantime, the second program 34 of the inside mediation apparatus 13 processes the command (instruction) included in a response to an HTTP request that includes an A-type first event ID as an A-type first command, processes the command (instruction) included in a response to an HTTP request that includes a B-type first event ID as a B-type first command, and processes the command (instruction) included in a response to an HTTP request that includes a second event ID as a second command Fourth Variation The fourth variation covers a case in which each of HTTP requests including A-type first requests for requesting the return of A-type first commands, HTTP requests including B-type first requests for requesting the return of B-type first commands, and HTTP requests including second requests for requesting the return of second commands are transmitted periodically. This variation will be described with reference to FIG. 8(B). Structural components and process steps identical to those in the embodiment and variations described above are designated with the same part numbers and step numbers to avoid duplicating description. All other structures and processes in the fourth variation that are not described below are identical to those in the embodiment and variations described above.

The memory 22 of the outside mediation apparatus 12 stores the first correlation list described in the third variation. The first program 24 of the outside mediation apparatus 12 uses this first correlation list to determine whether a command to be generated is an A-type first command, a B-type first command, or a second command.

Figure 8:
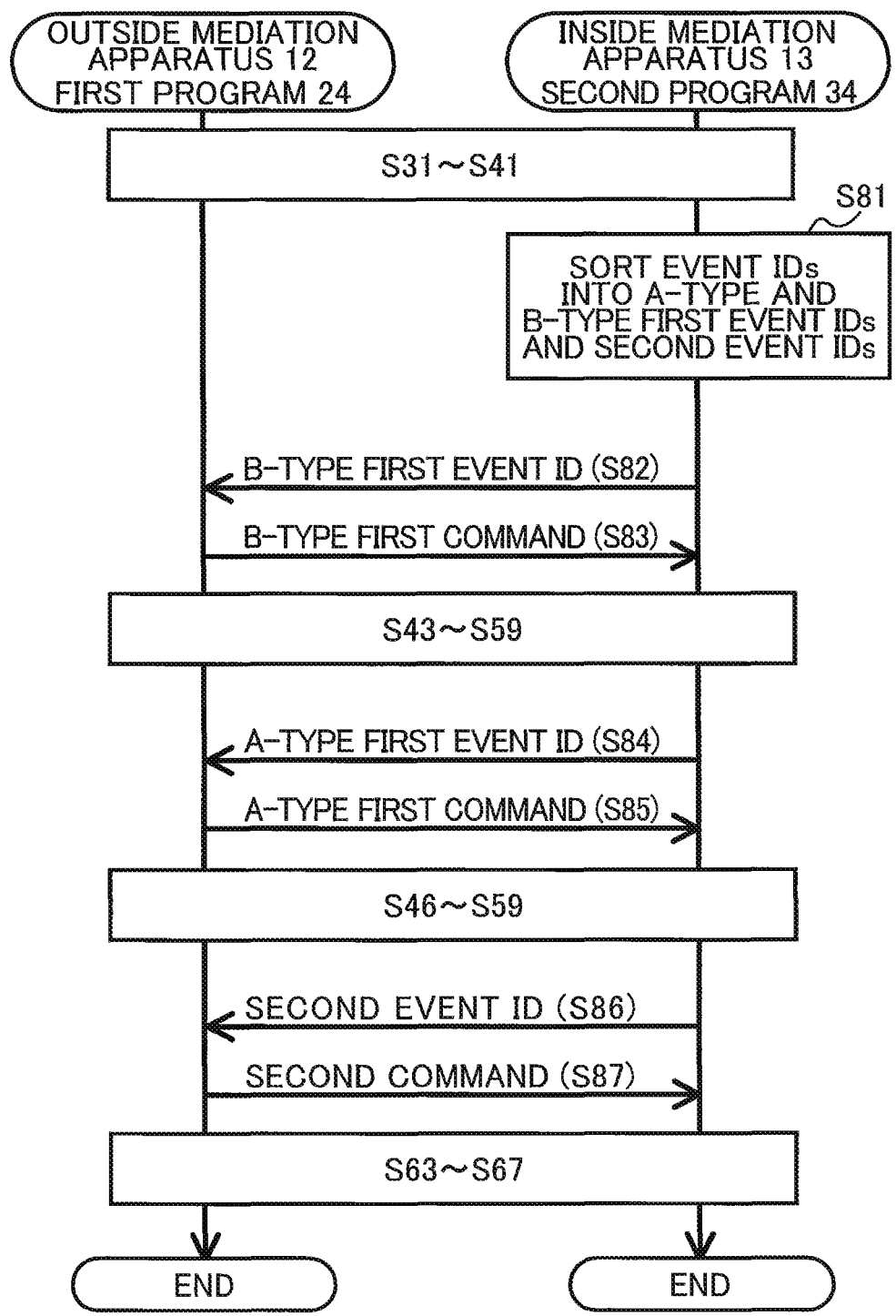
FIG. 8(A) is a sequence diagram illustrating a process according to a third variation.
FIG. 8(B) is a sequence diagram illustrating a process according to a fourth variation.
Figure 8:
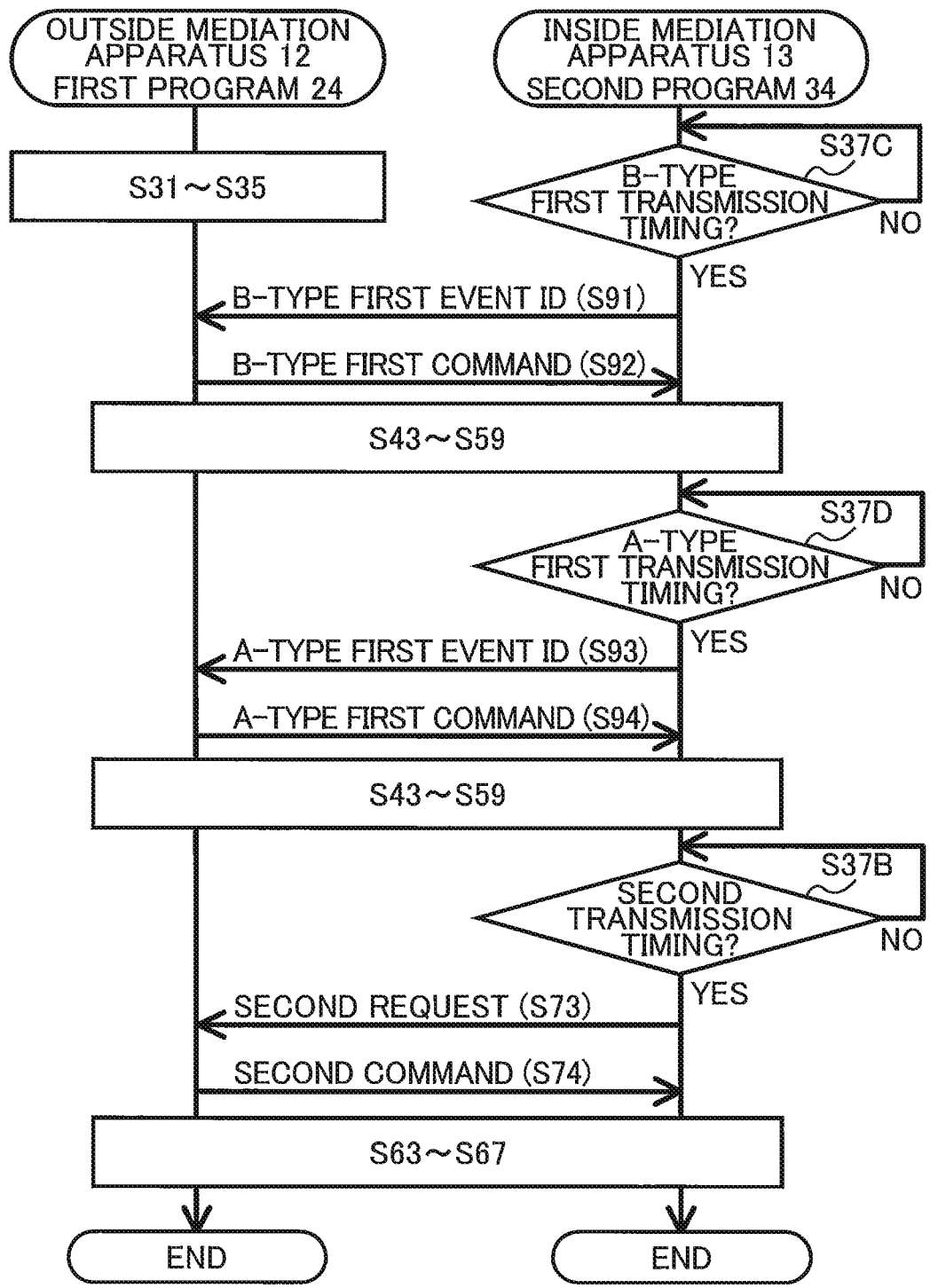

As shown in FIG. 8(B), the first program 24 of the outside mediation apparatus 12 executes the process of S31-S35 described in the embodiment. That is, the first program 24 generates first commands and second commands (S34A, S34B) and identifies GUIDs (S35).

In the meantime, in S37C the second program 34 of the inside mediation apparatus 13 determines whether a B-type first transmission timing for transmitting an HTTP request including a B-type first request has arrived. The B-type first request is a request to return a B-type first command. When the second program 34 determines that the B-type first transmission timing has arrived (S37C: YES), in S91 the second program 34 transmits an HTTP request including a B-type first request to the outside mediation apparatus 12.

In response to receiving the HTTP request including a B-type first request in S91, in S92 the first program 24 identifies a B-type first command using the first correlation list and transmits an HTTP response including this identified command to the inside mediation apparatus 13 as a response to the HTTP request received in S91.

In response to receiving the HTTP request including a B-type first command in S92, the second program 34 executes the process in S46-S59 described in the embodiment. Here, the control program 44 of the printer 14 that receives the device command transmitted in S48 performs the modification in S51 on settings information that does not require a restart.

In S37D the second program 34 of the inside mediation apparatus 13 determines whether an A-type first transmission timing for transmitting an HTTP request including an A-type first request has arrived. The A-type first request is a request for the return of an A-type first command. When the second program 34 determines that the A-type first transmission timing has arrived (S37D: YES), in S93 the second program 34 transmits an HTTP request including an A-type first request to the outside mediation apparatus 12.

In response to receiving this HTTP request including an A-type first request in S93, in S94 the first program 24 identifies the A-type first command using the first correlation list and transmits an HTTP response including this identified command to the inside mediation apparatus 13 as a response to the HTTP request received in S93.

In response to receiving this HTTP response including an A-type first command in S94, the second program 34 of the inside mediation apparatus 13 executes the process in S46-S59 described in the embodiment. Note that the control program 44 of the printer 14 that receives the device command transmitted in S48 performs the modification in SM on settings information that requires a restart.

In S37B the second program 34 of the inside mediation apparatus 13 determines whether a second transmission timing for transmitting an HTTP request including a second request has arrived. When the second program 34 determines that the second transmission timing has arrived (S37B: YES), in S73 the second program 34 transmits an HTTP request including a second request to the outside mediation apparatus 12.

In response to receiving this HTTP request including a second request in S73, in S74 the first program 24 of the outside mediation apparatus 12 identifies a second command using the first correlation list and transmits an HTTP response including the identified command to the inside mediation apparatus 13 as a response to the HTTP request received in S73.

After receiving the HTTP response including a second command in S74, the second program 34 executes the process in S63-S67 described in the embodiment.

Steps S37C is executed repeatedly and thus S37D and S37B are executed repeatedly after YES determination is made in previously executed S37B. The inside mediation apparatus 13 transmits an HTTP request in S91 each time the B-type first transmission timing has arrived, and thus the HTTP request is transmitted periodically. Similarly, the inside mediation apparatus 13 transmits an HTTP request in S93 each time the A-type transmission timing has arrived, and thus the HTTP request is transmitted periodically. Further, the inside mediation apparatus 13 transmits an HTTP request in S73 each time the second transmission timing has arrived, and thus the HTTP request is transmitted periodically. If there is no command corresponding to the received event ID to be transmitted, the first program 24 may transmit an HTTP request having information indicating that there is no command corresponding to the received event ID in S92, S94, and S74.

Effects of the Fourth Variation

In the fourth variation, the second program 34 transmits an HTTP request including an A-type first request and processes the command (instruction) included in the HTTP response received in response to this HTTP request as a first command requiring a restart. Further, the second program 34 transmits an HTTP request including a B-type first request and processes the command (instruction) included in the HTTP response received in response to this HTTP request as a first command not requiring a restart. Additionally, the second program 34 transmits an HTTP request that includes a second request and processes the command (instruction) included in the HTTP response received in response to this HTTP request as a second command intended for itself (the second program 34). Hence, the second program 34 can process commands included in HTTP responses without determining whether the command specifies an instruction for a printer 14 that requires a restart, an instruction for a printer 14 that does not require a restart, or an instruction for itself.

Fifth Variation

The embodiment describes a case in which the second program 34 of the inside mediation apparatus 13 sorts each of event IDs included in an event list received from the outside mediation apparatus 12 into one of first event ID for printers 14 and second event ID for itself (the second program 34). The fifth variation covers a case in which the second program 34 transmits the event IDs included in the event list to the outside mediation apparatus 12 without sorting the event IDs into first event ID and second event ID. This variation will be described with reference to FIG. 9. Note that the structural parts and process steps identical to those in the embodiment are designated with the same part numbers and step numbers to avoid duplicating description. All other structures and processes not described below are similar to those in the embodiment.

As in the embodiment, the first program 24 of the outside mediation apparatus 12 and the second program 34 of the inside mediation apparatus 13 execute the process in S31-S41 in the fifth variation.

In S101 the second program 34 of the inside mediation apparatus 13 extracts a plurality of event IDs from the event list included in the HTTP response received in S41. In S102 the second program 34 transmits an HTTP request including one of the event IDs extracted in S101 to the outside mediation apparatus 12. The HTTP request transmitted in S102 is separate from the HTTP requests that are periodically transmitted in S37. In other words, when the second program 34 acquires event IDs in S101, the second program 34 transmits an HTTP request including an event ID to the outside mediation apparatus 12 without waiting for the transmission timing for transmitting HTTP requests to arrive. This HTTP request with an event ID is an example of the command return request. The process of S102 for transmitting an HTTP request including an event ID is an example of the command return requesting means or step.

In response to receiving this HTTP request in S102, in S103 the first program 24 of the outside mediation apparatus 12 uses the event ID in the HTTP request and the first correlation list stored in the memory 22 to identify the first command or second command (hereinafter simply called "command"), as in the embodiment. In S104 the first program 24 transmits an HTTP response that includes the identified command to the inside mediation apparatus 13 as a response to the HTTP request received in S102. The process of S102 in which the first program 24 receives an HTTP request including an event ID is an example of the command return request receiving means or step. The process of S104 for transmitting an HTTP response that includes a command is an example of the command transmitting means or step.

In response to receiving this HTTP response including the command in S104, in S105 the second program 34 of the inside mediation apparatus 13 transmits to the outside mediation apparatus 12 an HTTP request including a reception notification indicating that the command was received. Further, the second program 34 performs a process based on the command included in the HTTP response. Specifically, the second program 34 executes the process of S47-S56 for generating a device command and for transmitting this device command to the printer 14 when the command is a first command, and executes the process of S64 and S65 based on the command when the command is a second command.

The second program 34 executes the processes in S102-S105, S47-S56, S64, and S65 for each of the event IDs acquired in S101 in an order of the event IDs indicated in the event list. Note that the second program 34 may transmit consecutive HTTP requests to the outside mediation apparatus 12 that each include one event ID among event IDs received in S101, may transmit the next HTTP request including an event ID to the outside mediation apparatus 12 after transmitting a reception notification in S105, or may transmit the next HTTP request including an event ID to the outside mediation apparatus 12, after executing the process in S55 or S65 as a response to the command Effects of the Fifth Variation In the fifth variation, the second program 34 transmits HTTP requests including event IDs without waiting for the transmission timing for periodic HTTP requests. Therefore, the time required for the second program 34 to receive a command transmitted from the first program 24 and to execute the instruction specified by the command is shorter than when the first program 24 includes the command in an HTTP response and transmits the HTTP response to the inside mediation apparatus 13 as a response to a periodic HTTP request received from the inside mediation apparatus 13.

Further, since the commands are transmitted to the second program 34 of the inside mediation apparatus 13 one at a time, the second program 34 can execute the process specified by the command received from the outside mediation apparatus 12. In other words, the second program 34 performs a process based on the instruction in the received command without determining whether the received command is for a printer 14 or for itself (the second program 34). Accordingly, the second program 34 need not determine the type of the received command Other Variations The embodiment describes a case in which HTTP requests including second event IDs are transmitted after transmitting HTTP requests including first event IDs. However, the HTTP requests including first event IDs may be transmitted after the HTTP requests including second event IDs. Alternatively, HTTP requests including first event IDs and HTTP requests including second event IDs may be transmitted randomly. The first program 24 of the outside mediation apparatus 12 transmits a first command when the event ID included in an HTTP request is a first event ID and transmits a second command when the event ID is a second event ID. In the meantime, the second program 34 of the inside mediation apparatus 13 processes a command (instruction) included in the response to an HTTP request including a first event ID as a first command and processes the command (instruction) included in the response to an HTTP request including a second event ID as a second command. The event list may include device IDs included in the base commands and the generated first commands in S34A. In this case, in the event list, each device ID is correlated with the event ID corresponding to the generated first command. In S43 or S60, the device ID may be transmitted together with the event ID. In this case, in S48 or S63, the first program 24 may transmit the first command and the second command which corresponds to the received event ID and device ID.

The embodiment and variations describe a case in which the second program 34 transmits an HTTP request including a first event ID or a first request, receives an HTTP response including a first command, transmits an HTTP request including a second event ID or a second request, and receives an HTTP response including a second command. However, the second program 34 may receive the first command and second command using a plurality of logical communication ports by which the second program 34 can differentiate the first commands from the second commands. More specifically, the second program 34 of the inside mediation apparatus 13 transmits an HTTP request having a first event ID or a first request for requesting a command to the outside mediation apparatus 12 using a first logical communication port and transmits an HTTP request having a second event ID or a second request for requesting a command to the outside mediation apparatus 12 using a second logical communication port. The outside mediation apparatus 12 transmits an HTTP response that includes a first command to the inside mediation apparatus 13 in response to an HTTP request transmitted via the first logical communication port and transmits an HTTP response that includes a second command to the inside mediation apparatus 13 in response to an HTTP request transmitted via the second logical communication port. The second program 34 of the inside mediation apparatus 13 processes the command (instruction) included in an HTTP response received via the first logical communication port as a first command and processes the command (instruction) included in an HTTP response received via the second logical communication port as a second command Hence, the second program 34 can process commands received from the outside mediation apparatus 12 without determining whether the command is a first command or a second command.

Further, the embodiment describes a case in which the administrator inputs instructions into the outside mediation apparatus 12 via the management server 11. However, the administrator may input instructions directly into the outside mediation apparatus 12. In other words, the administrator need not use the management server 11. In this case, the outside mediation apparatus 12 serves as the management server for managing the printers 14. The administrator inputs a device ID, and instruction information specifying an instruction for the printer 14 designated by the device ID into the outside mediation apparatus 12 using the user interface 26 of the outside mediation apparatus 12. The first program 24 of the outside mediation apparatus 12 receives the device ID and instruction information inputted by the administrator. By directly inputting instruction information into the outside mediation apparatus 12 in this way, the administrator can update the firmware version of the control program 44 on the printer 14 and modify settings information for the printer 14.

The embodiment describes a case in which a second command is transmitted from the outside mediation apparatus 12 to the inside mediation apparatus 13 via a firewall by the inside mediation apparatus 13 transmitting an HTTP request and the outside mediation apparatus 12 returning an HTTP response. However, another communication protocol may be used, provided that the first command and the second command can be transmitted from the outside mediation apparatus 12 to the inside mediation apparatus 13 via the firewall. For example, the outside mediation apparatus 12 and the inside mediation apparatus 13 may communicate with each other using a communication protocol conforming to XMPP Over BOSH. In this case, a session is established by the inside mediation apparatus 13 transmitting a session creation request according to XMPP Over BOSH to the outside mediation apparatus 12 and the outside mediation apparatus 12 returning a session creation response. During the established session, the outside mediation apparatus 12 can then transmit the second command to the inside mediation apparatus 13 via the firewall.

In the embodiment, the printers 14 are used as an example of devices being managed. However, the devices under management may be scanners, such as QR code (registered trademark) readers, bar code readers, or handheld scanners; portable sewing machines; and the like.

The processes or the steps described in one of the above embodiment and modifications may be combined with the processes or the steps in remaining one of the embodiment and the modifications.

What is claimed is:

1. A communication system comprising an information processing apparatus and a mediation apparatus,
   wherein the information processing apparatus is configured to communicate with Internet and communicate with the mediation apparatus through firewall, the information processing apparatus including a first control device,
   wherein the mediation apparatus is configured to communicate with a device via a local network, the mediation apparatus including a second control device configured to perform:
      transmitting to the information processing apparatus through the firewall a first request for requesting transmission of a first command directing the mediation apparatus to issue a device command for instructing the device;
      transmitting to the information processing apparatus through the firewall a second request for requesting transmission of a second command directing the mediation apparatus to execute a second-command dependent instruction;
      in response to receiving the first command, transmitting to the device via the local network the device command based on the first command; and
      in response to receiving the second command, performing the second-command dependent instruction,
   wherein the first control device is configured to perform:
      in response to receiving the first request, transmitting the first command to the mediation apparatus through the firewall; and
      in response to receiving the second request, transmitting the second command to the mediation apparatus through the firewall;
   wherein the information processing apparatus further includes a first memory storing first correlation information which correlates each of event IDs with one of the first command and the second command,
   wherein the mediation apparatus further includes a second memory storing second correlation information which correlates each of event IDs with one of the first request and the second request, and
   wherein the first control device is configured to further perform transmitting event information including a plurality of event IDs according to a series of procedures which is initiated by the mediation apparatus and enables the mediation apparatus to receive information from the information processing apparatus through the firewall.

2. The communication system according to claim 1, wherein the second control device is configured to further perform:
   initiating the series of procedures;
   receiving the event information from the information processing apparatus through the firewall; and
   determining, by using the second correlation information, for each of the plurality of event IDs included in the event information whether the event ID indicates the first request or the second request,
   wherein in a case where the second control device determines that the event ID indicates the first request, the second control device transmits the first request including the event ID,
   wherein in a case where the second control device determines that the event ID indicates the second request, the second control device transmits the second request including the event ID,
   wherein the first control device is configured to further perform:
   identifying the first command based on the event ID included in the received first request by using the first correlation information, wherein the transmitting a first command transmits the identified first command to the mediation apparatus; and
   identifying the second command based on the event ID included in the received second request by using the first correlation information, wherein the transmitting a second command transmits the identified second command to the mediation apparatus.

3. The communication system according to claim 1, wherein the second control device is further configured to perform:
   determining whether a first timing arrives, wherein the transmitting a first request is performed when it is determined that the first timing arrives; and
   determining whether a second timing arrives, wherein the transmitting a second request is performed when it is determined that the second timing arrives.

4. The communication system according to claim 1, wherein the second control device is further configured to perform determining whether a timing arrives, the transmitting a first request is performed when it is determined that the timing arrives,
   wherein the transmitting a first command transmits the first command together with an instruction for transmitting the second request,
   wherein the transmitting a second request is performed in response to receiving the instruction for transmitting the second request together with the first command.

5. The communication system according to claim 1, wherein the first request is transmitted via a first logic communication port, and the second request is transmitted via a second logic communication port.

6. The communication system according to claim 1, wherein the first command is one of an A-type first command requiring the device to restart and a B-type first command not requiring the device to restart,
   wherein the first request is one of an A-type first request corresponding to the A-type first command and a B-type first request corresponding to the B-type first command,
   wherein the transmitting a first request is performed a plurality of times so that a plurality of A-type first requests and a plurality of B-type first requests are separately transmitted to the information processing apparatus through the firewall,
   wherein the transmitting a first command is performed a plurality of times so that a plurality of A-type first commands and a plurality of B-type first commands are separately transmitted to the mediation apparatus through the firewall.

7. A communication system comprising an information processing apparatus and a mediation apparatus,
   wherein the mediation apparatus is configured to communicate with a device via a local network,
   wherein the information processing apparatus is configured to communicate with Internet and communicate with the mediation apparatus through firewall, the information processing apparatus including: a memory storing correlation information which correlates each of event IDs with one of a first command and a second command, the first command being for the device and the second command being for the mediation apparatus; and a first control device configured to perform:
   transmitting event information according to a series of procedures which is initiated by the mediation apparatus and enables the mediation apparatus to receive information from the information processing apparatus through the firewall, the event information including a plurality of event IDs and specifying an order of the plurality of event IDs;
   receiving a command transmission request from the mediation apparatus through the firewall, the command transmission request including an event ID included in the event information;
   determining one of the first command and the second command as a target command for transmission on a basis of the event ID included in the command transmission request by using the correlation information; and
   transmitting the target command to the mediation apparatus through the firewall,
   wherein the mediation apparatus includes a second control device configured to perform:
   initiating the series of procedures enabling the mediation apparatus to receive information from the information processing apparatus through the firewall;
   receiving the event information from the information processing apparatus through the firewall;
   transmitting separately a plurality of command transmission requests including respective ones of the plurality of event IDs included in the event information to the information processing apparatus through the firewall so that the plurality of event IDs is transmitted to the information processing apparatus according to the order specified by the event information;
   receiving the target command from the information processing apparatus through the firewall;
   in response to receiving the first command as the target command, transmitting to the device via the local network a device command which the device is capable of interpreting on a basis of the first command; and
   in response to receiving the second command as the target command, performing a second-command-dependent instruction based on the second command.

8. A non-transitory computer readable storage medium storing a set of program instructions comprising first program instructions executed by an information processing apparatus, and second program instructions executed by a mediation apparatus, the information processing apparatus being configured to communicate with Internet and communicate with the mediation apparatus through firewall, the mediation apparatus being configured to communicate with a device via a local network, wherein the second program instructions comprise:
- transmitting to the information processing apparatus through the firewall a first request for requesting transmission of a first command directing the mediation apparatus to issue a device command for instructing the device;
- transmitting to the information processing apparatus through the firewall a second request for requesting transmission of a second command directing the mediation apparatus to execute a second-command dependent instruction;
- in response to receiving the first command, transmitting to the device via the local network the device command based on the first command; and
- in response to receiving the second command, performing the second-command dependent instruction,
- wherein the first program instructions comprise:
- in response to receiving the first request, transmitting the first command to the mediation apparatus through the firewall; and
- in response to receiving the second request, transmitting the second command to the mediation apparatus through the firewall;
- wherein the information processing apparatus further includes a first memory storing first correlation information which correlates each of event IDs with one of the first command and the second command,
- wherein the mediation apparatus further includes a second memory storing second correlation information which correlates each of event IDs with one of the first request and the second request, and
- wherein the first program instructions further comprises transmitting event information including a plurality of event IDs according to a series of procedures which is initiated by the mediation apparatus and enables the mediation apparatus to receive information from the information processing apparatus through the firewall.

9. A non-transitory computer readable storage medium storing a set of program instructions comprising first program instructions executed by an information processing apparatus, and second program instructions executed by a mediation apparatus, the mediation apparatus being configured to communicate with a device via a local network, the information processing apparatus being configured to communicate with Internet and communicate with the mediation apparatus through firewall, the information processing apparatus including a memory storing correlation information which correlates each of event IDs with one of a first command and a second command, the first command being for the device and the second command being for the mediation apparatus, wherein the first program instructions comprise:
- transmitting event information according to a series of procedures which is initiated by the mediation apparatus and enables the mediation apparatus to receive information from the information processing apparatus through the firewall, the event information including a plurality of event IDs and specifying an order of the plurality of event IDs;
- receiving a command transmission request from the mediation apparatus through the firewall, the command transmission request including an event ID included in the event information;
- determining one of the first command and the second command as a target command for transmission on a basis of the event ID included in the command transmission request by using the correlation information; and
- transmitting the target command to the mediation apparatus through the firewall,
- wherein the second program instructions comprise:
- initiating the series of procedures enabling the mediation apparatus to receive information from the information apparatus through the firewall;
- receiving the event information from the information processing apparatus through the firewall;
- transmitting separately a plurality of command transmission requests including respective ones of the plurality of event IDs included in the event information to the information processing apparatus through the firewall so that the plurality of event IDs is transmitted to the information processing apparatus according to the order specified by the event information;
- receiving the target command from the information processing apparatus through the firewall;
- in response to receiving the first command as the target command, transmitting to the device via the local network a device command which the device is capable of interpreting on a basis of the first command; and
- in response to receiving the second command as the target command, performing a second-command-dependent instruction based on the second command.

* * * * *